(12) United States Patent
Morrell

(10) Patent No.: US 7,437,202 B2
(45) Date of Patent: *Oct. 14, 2008

(54) SYSTEM AND METHOD FOR CONTROL SCHEDULING

(75) Inventor: John B. Morrell, Manchester, NH (US)

(73) Assignee: Deka Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/591,284

(22) Filed: Oct. 31, 2006

(65) Prior Publication Data

US 2007/0198109 A1   Aug. 23, 2007

Related U.S. Application Data

(60) Division of application No. 10/419,994, filed on Apr. 21, 2003, now Pat. No. 7,130,702, which is a continuation of application No. 09/322,431, filed on May 28, 1999, now Pat. No. 6,553,271.

(51) Int. Cl.
G05B 13/02 (2006.01)
G05B 7/02 (2006.01)

(52) U.S. Cl. .......................... 700/75; 700/40; 700/54; 318/590; 318/591

(58) Field of Classification Search ............... 700/75, 700/40, 71, 28, 76, 77, 37, 54; 180/8.2, 907; 318/590, 594, 591
See application file for complete search history.

(56) References Cited

U.S. PATENT DOCUMENTS

| | | | | |
|---|---|---|---|---|
| 4,460,858 A | * | 7/1984 | Ashland | 318/585 |
| 4,976,169 A | * | 12/1990 | Sasajima et al. | 60/449 |
| 6,553,271 B1 | * | 4/2003 | Morrell | 700/75 |
| 7,130,702 B2 | * | 10/2006 | Morrell | 700/75 |

* cited by examiner

Primary Examiner—Albert DeCady
Assistant Examiner—Steven R Garland
(74) Attorney, Agent, or Firm—McCormick, Paulding & Huber LLP

(57) ABSTRACT

A system and method for controlling a device such that device operates in a smooth manner. The system may switch between control architectures or vary gain coefficients used in a control loop to control the device. As the architecture or gains are switched, the control signal may be smoothed so that the device does not experience an abrupt change in the control signal it receives. In one embodiment, the control signal may be smoothed by adding a decaying offset value to the control signal to create a smoothed control signal that is applied to the device.

2 Claims, 25 Drawing Sheets

| MODE | $C_1$ | $C_2$ | $C_3$ |
|---|---|---|---|
| 1 | 1 | 3 | 7 |
| 2 | 0 | 5 | 6 |
| 3 | 4 | 7 | 1 |
1402 → row 1; 1406 → row 2; 1408 → row 3
Fig. 14
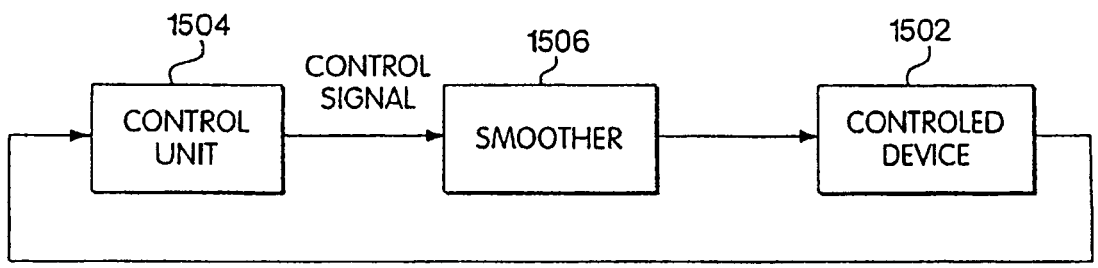
Fig. 15
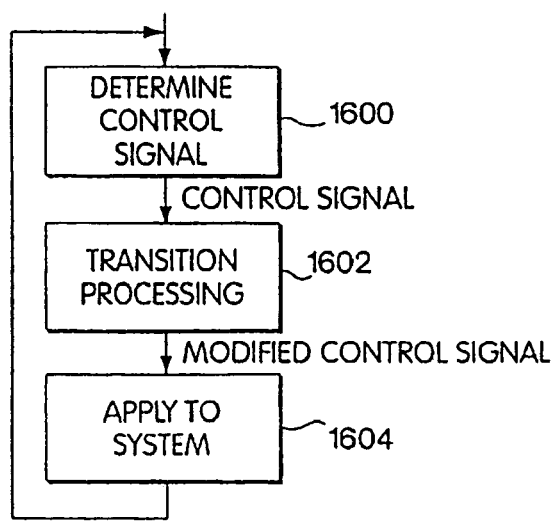
Fig. 16

SYSTEM AND METHOD FOR CONTROL SCHEDULING

This application is a divisional application of U.S. Ser. No. 10/419,994, filed Apr. 21, 2003, issuing as U.S. Pat. No. 7,130,702 on Oct. 31, 2006, which is continuation application of U.S. patent application Ser. No. 09/322,431, filed on May 28, 1999, issued as U.S. Pat. No. 6,553,271 on Apr. 22, 2003, from which the present application claims priority. Both of the foregoing applications are incorporated herein by reference.

FIELD OF INVENTION

The present invention is related to the field of control scheduling and, more particularly, to the field of smoothly changing between different control modes.

DISCUSSION OF RELATED ART

Human transporter devices serve to move a person over a surface and may take many different forms. For example, a human transporter device, as the term is used herein, may include, but is not limited to, wheelchairs, motorized carts, bicycles, motorcycles, cars, hovercrafts, and the like. Some types of human transport may include stabilization mechanisms to help ensure that the device does not fall over and injure the user of the transport device.

A typical four wheeled wheelchair contacts the ground with all four wheels. If the center of gravity of the combination of the wheelchair and the user remains over the area between the wheels, the wheelchair should not tip over. If the center of gravity is located above and outside of the ground contacting members of the transport device, the transport device may become unstable and tip over.

Referring now to FIG. 1A, a typical wheelchair 100 is shown. The wheelchair 100 and the user 102 defines a frame. The frame has a center of gravity 104 located at a position vertically disposed above the surface 106. The term "surface" as it is used herein shall refer to any surface upon which a human transport device may sit. Examples of a surface include flat ground, an inclined plane such as a ramp, a gravel covered street, and may include a curb which vertically connects two substantially parallel surfaces vertically displaced from one another (e.g., a street curb).

The surface 106 may be at an incline as compared to the horizontal axis 108. The angle by which the surface 106 is offset from the horizontal axis 108 shall be referred to herein as the surface pitch and will be represented by an angle denoted as $\theta_s$.

The front wheel 112 and the rear wheel 110 of the wheelchair 100 are separated by a distance d. The distance d between the two wheels may be measured as a linear (e.g., straight line) distance. If the center of gravity 104 of the system is located at a position above and between the two wheels, 110 and 112, the wheelchair 100 should remain upright and relatively stable. The wheels 110 and 112 typically have opposing counterparts (not shown) on the other side of the wheelchair. The opposing counterparts may each share an axis with wheels 110 and 112, respectively. The area covered by the polygon which connects the points where these four wheels touch the ground (or the outside portions of the ground contacting parts, when the ground contacting part may cover more than a point) provides an area over which the center of gravity 104 may be located while the wheelchair remains stable. In various places in this discussion below this area may be referred to as the footprint of the device. The footprint of a device, as the term is used herein, is defined by the projection of the area between the wheels as projected onto the horizontal plane. If the center of gravity is above this location, the transport device should remain stable.

If the center of gravity 104 is vertically displaced above the surface 106 and outside the footprint (i.e., the projection of area between the wheels 110 and 112 onto the horizontal plane), the stability of the wheelchair 100 may decrease and the wheelchair 100 may tip over. This could happen, for example, when the wheelchair is on a surface that has a steep incline. When on a steep incline, the center of gravity 104 may shift back and cause the wheelchair 100 to flip over backwards. This is shown in FIG. 1B where the center of gravity 104 is located at a position that is outside the footprint of the wheelchair 100. The center of gravity 104 is shown including a gravity acceleration vector (g) which linearly translates the center of gravity 104 in a downward direction. The wheelchair 100 may rotate about an axis of the rear wheel 110 until the wheelchair 100 contacts the surface being traversed.

The user 102 may help to return the center of gravity 104 to a location that is above the area between the wheels 110 and 112 by leaning forward in the wheelchair 100. Given this limited control of the location of the center of gravity 104, it is clear that human transport devices such as wheelchairs may encounter great difficulties when traversing uneven surfaces such as a curb or steps.

Other types of human transport devices may include control mechanisms which allow the transport device to balance on two wheels. The two wheels may be connected to a single axis that passes through the center of the wheels. The axis connects the wheels in such a manner that the forward and backwards motion of the device is perpendicular to the axis. The control mechanisms may keep the device and the user in a stable upright position by driving the wheels forwards and backwards to keep the center of gravity located over the wheel axis. Such devices may additionally provide for locomotion by allowing the center of gravity to be displaced by a distance forward or backwards from wheel axis and having the wheels rotate in order keep the center of gravity located at that position. Examples of such devices are disclosed in U.S. Pat. Nos. 5,701,965 and 5,719,425 which are hereby incorporated by reference.

SUMMARY OF THE INVENTION

According to embodiment of the present invention, a system of converting between a first operating mode and a second operating mode in a device is disclosed. In this embodiment, the system includes a control loop which utilizes gain coefficients associated with the first operating mode to control the system in the first operating mode and utilizes gain coefficients associated with the second operating mode when operating in the second operating mode. In this embodiment, the system also includes a gain selector which causes the control loop to operate using the coefficients associated with the second operational mode at substantially the same instant that the device transitions from the first operational mode to the second operational mode.

According to another embodiment of the present invention, a method of smoothly operating a device that is responsive to a control signal is disclosed. In this embodiment, the method includes steps of determining a value for the control signal, processing the control signal to create a modified control signal, and applying the modified control signal to the device.

In another embodiment of the present invention, a method of smoothly switching between modes in a multi-modular apparatus is disclosed. In this embodiment, the method includes steps of determining whether a mode change has occurred, and determining an offset value if the mode has changed. In this embodiment, the method also includes steps of adding a decaying version of the offset value to a control signal before the control signal is applied to the apparatus to create a smoothed control signal, and applying the smoothed control signal to the apparatus.

BRIEF DESCRIPTION OF THE DRAWINGS

FIG. 14 illustrates an example of a gain table which may be used according to aspects of the present invention.

FIG. 15 illustrates an example of a system that may be implemented to smooth a control signal before it is applied to a control device.

FIG. 16 illustrates a block diagram of a method of smoothing a control signal.

DETAILED DESCRIPTION

Aspects of the present invention relate to various control modes for the operation of a human transport device. Each of the various modes allow for different types of control. In some embodiments, some of the modes are very responsive to user input commands while others may entirely ignore user input commands in an effort to keep the transport device and, ultimately, the user in an upright and stable position.

Figure 1A:
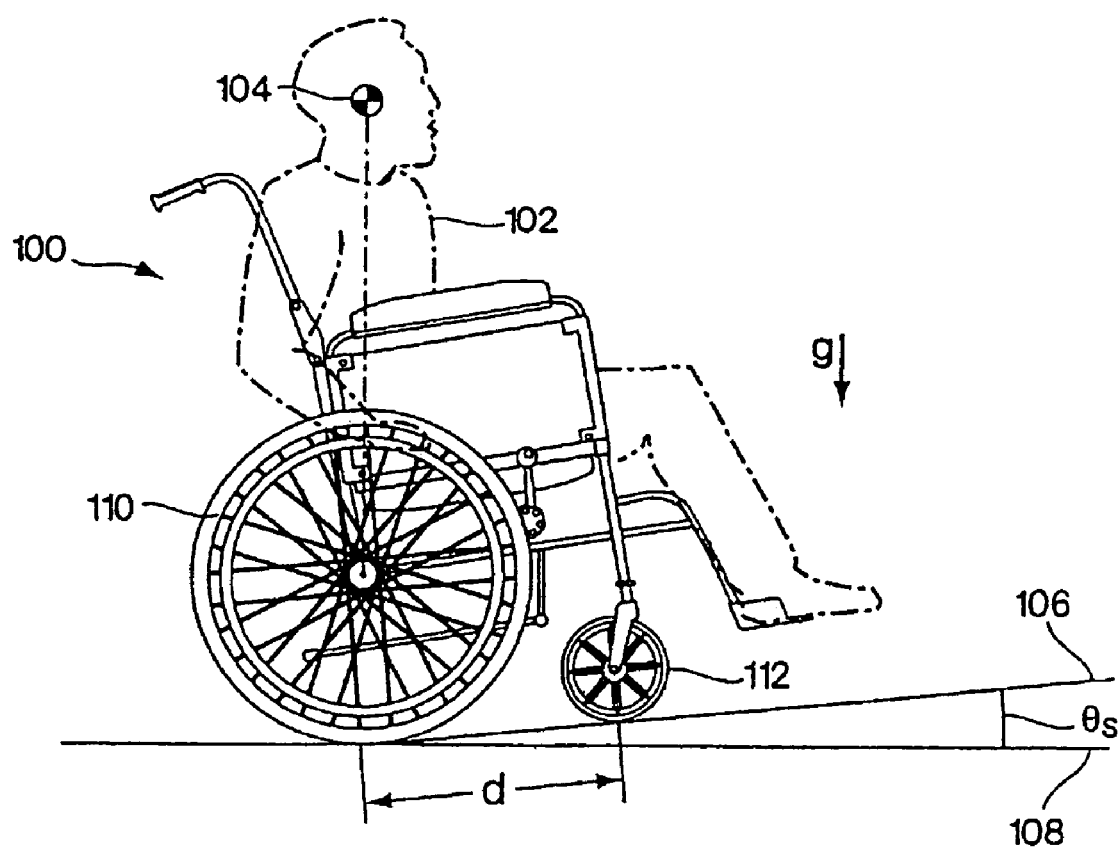
FIGS. 1A and 1B illustrate an example of a prior art wheelchair.
Figure 1B:
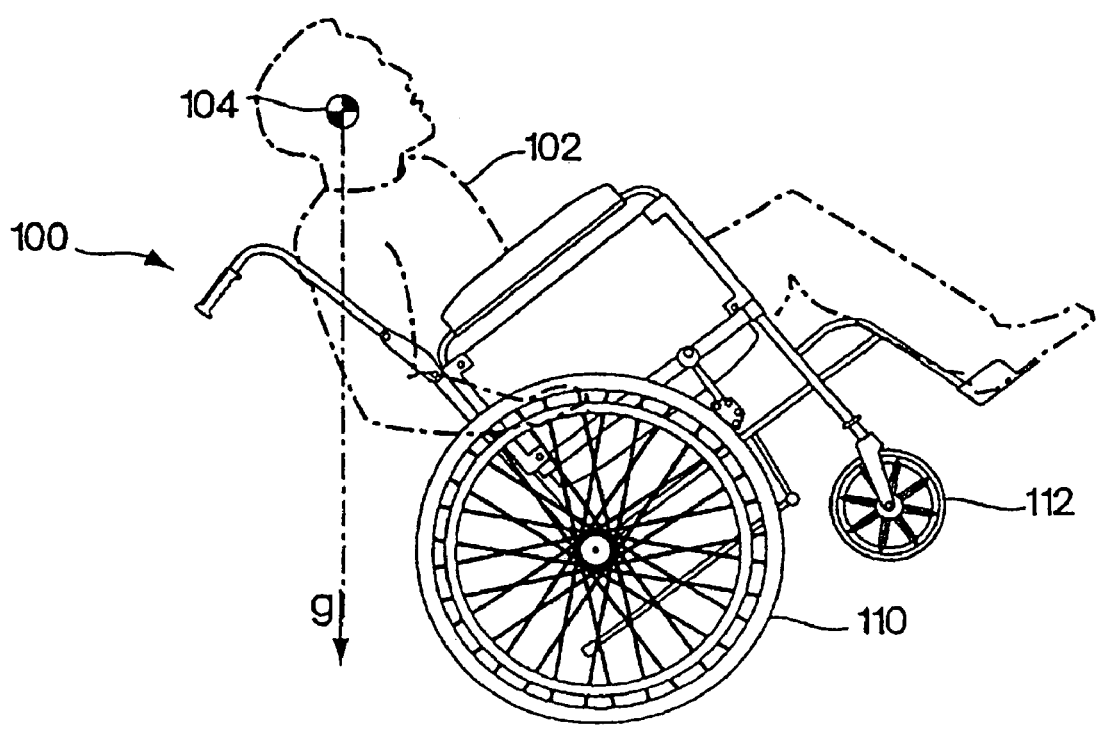
Figure 2A:
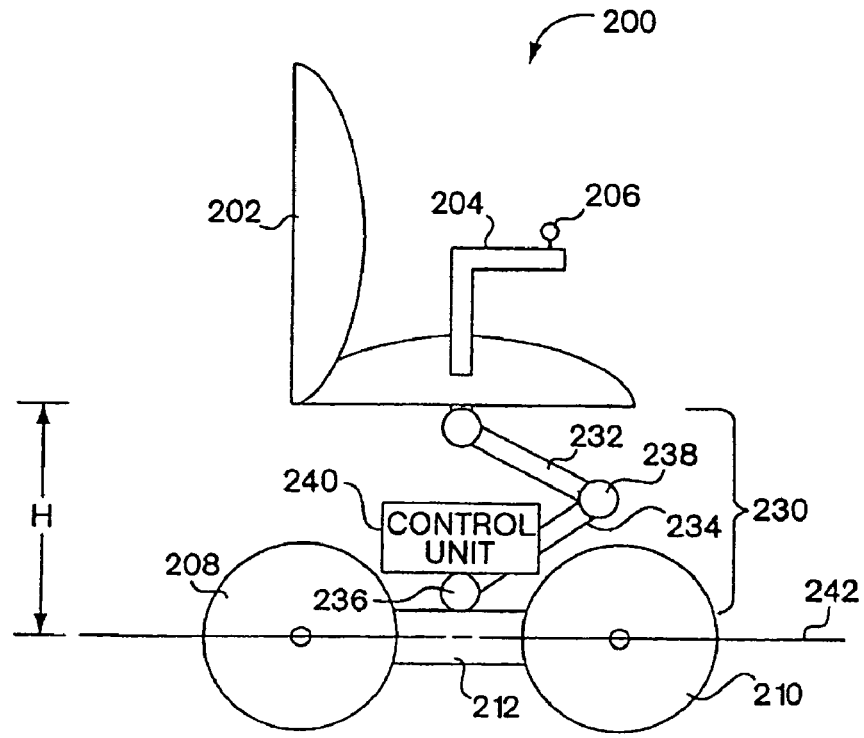
FIGS. 2A-2F illustrate various embodiments of a human transport device.

FIG. 2A shows an example of a transport device 200 in which aspects of the present invention may be implemented. Note that various aspects of the invention will be described in relation to various transport devices, however, the teachings herein are not limited to implementation only in human transport devices. For example, various control modes may be applicable to transport devices that are not similar to the transport device 200 shown in FIG. 2A. In addition, the systems and methods that allow for smooth transitions between the various modes may be applicable to other devices.

The transport device 200 may include a platform 202 suitable for supporting a human user (not shown). The platform 202 may be a chair-like platform upon which a user sits, like the one shown in FIG. 2A. However, as discussed below, the platform 202 need not be a chair-like platform but may be any type of platform capable of supporting a human user. For instance the platform could be a platform upon which a user stands.

The transport device 200 also may include an arm 204 similar to an arm of a chair. The arm may provide a place for the user to lean against or to otherwise support the user. The arm 204 may include a user interface 206 such as joystick which may receive directional command inputs from the user. Other types of user interfaces could include, but are not limited to, a roller ball, a touch pad, a breath sensitive input, a position reporting sensor attached to the user or to an article of clothing worn by the user, a voice recognition system, or push button controls. The user interface 206 may relay these input commands to a control unit 240 of the transport device 200 in order to effect motion in a desired direction of the transport device 200. The user interface 206 may also effect the velocity of motion.

The transport device 200 may also include ground contacting members 208 and 210. As shown in FIG. 2A the ground contacting members 208 and 210 are wheels. However, it should be noted that the ground contacting members 208 and 210 are not limited to wheels. For instance, the ground contacting members could be a caster, a rigid member (e.g., such as the arcuate elements shown in FIGS. 22-24 of U.S. Pat. No. 5,791,425), treads or other mechanisms for locomotion. Human transport devices having these and other types of ground contacting members are discussed below.

In the embodiment including wheels 208 and 210, (he wheels contact the surface and provide for motion over the surface. The wheels 208 and 210 may be driven by a motor (not shown). Additionally, each wheel, 208 and 210, may be mirrored on an opposite side of the transport device with co-axial wheels (not shown) to provide four wheels which may contact the surface being traversed.

Figure 2B:
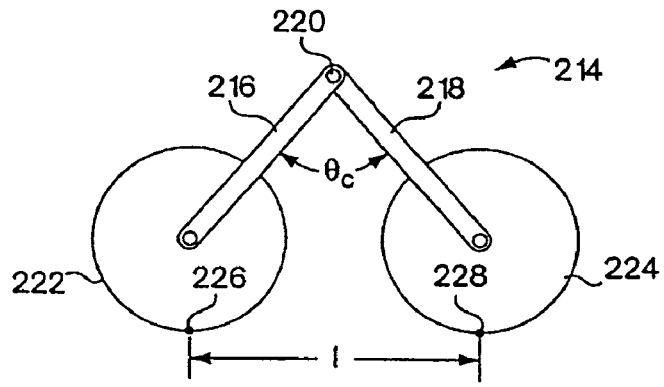

The wheels, 208 and 210, may be attached to a moveable arm 212 (or cluster). The terms moveable arm and cluster, as used herein shall refer to an assembly to which ground contacting members may be attached. In addition, the cluster may from time to time refer to the entire assembly which includes and connects the ground contacting members together depending on the context. The cluster 212 may be a rigid member or may be a member that may be folded around various axes. For example, referring now to FIG. 2B where a cluster 214 is shown having a first portion 216 and a second portion 218, the first portion 216 and the second portion 218 may be pivotally attached to one another at a pivot point 220. The cluster 214 may include two wheels 222 and 224. The two wheels, 222 and 224, may contact the surface at contact points 226 and 228, respectively. The distance between contact point 226 and contact point 228 define the length (l) of the footprint of the transport device in this embodiment because the cluster is on a horizontal plane. (Of course, if the cluster was on an incline, the length of the footprint would be equal to the length of the projection of L onto the horizontal plane.) The length (l) of the footprint is variable in this embodiment due to the pivot point 220 between the first portion 216 and the second portion 218 of the cluster 214. The length (l) of the footprint is at its largest when the angle $\theta_c$ between the first portion 216 of the cluster 214 and the second portion 218 of the cluster 214 is approximately 180°.

Figure 2C:
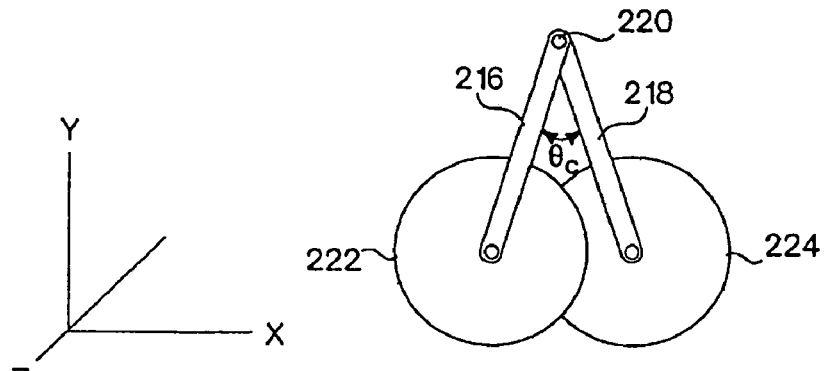

In one embodiment, the length of the footprint of the cluster may be shortened such that the angle $\theta_c$ between the first portion 216 and the second portion 218 of the cluster 214 becomes extremely small. An example of such an embodiment is shown in FIG. 2C. In this embodiment, the circumference of the wheels 222 and 224 may overlap. Of course, in this embodiment, the wheels 222 and 224 may be offset from another along the axis Z so that the wheels 222 and 224 do not contact one another and inhibit the rotation of the wheels.

Referring again to FIG. 2A, the cluster 212 may be attached to the platform 202 by a platform support 230. The platform support 230 may include an upper portion 232 and a lower portion 234. (The platform support 230 could also be a unitary member.)

In one embodiment, the lower portion 234 of the platform support 230 may be pivotally attached to the cluster 212. In order to adjust the height H between the cluster 214 and the base of the platform 202, the lower portion 234 of the platform support 230 may be rotated about a cluster connection pivot point 236 into a more vertical orientation. In addition, as the lower portion 234 is rotated towards vertical, the upper portion 232 may also be rotated about support pivot point 238 to attain an even greater platform height.

When the platform 202 is to be lowered, the lower portion 234 is brought closer to the cluster 212. In addition, the upper portion 232 may be brought closer to both the lower portion 234 and the cluster 212.

The transport device 200 may also include a control unit 240 (or electronics box). Generally, the control unit 240 provides the commands to various motors that may be included in the transport device 200 in order to operate the transport device 200. The control unit 240 may include various sensors such as, tilt sensors, velocity sensors, acceleration sensors, position reporting sensors, and the like. In one embodiment, the control unit 200 may adjust the position of the wheels, 208 and 210, and the angular orientation of the cluster 212, or both, in order to stabilize the transport device 200. In addition, the control unit 240 may cause the cluster 212 and the wheels 208 and 210 to rotate in order to respond to input commands received from the user interface 206. In one embodiment, the control unit 240, based on various sensor inputs, may adjust the angle of the cluster 212 relative to the platform 202 so that an axis 242 passing through the cluster 212 and the axles 244 and 246 of the wheels 208 and 210, respectively, is substantially parallel to the surface being traversed while the platform 202 is kept in an upright position. This type of orientation is preferable when the transport device 200 is operating in a standard or enhanced mode. Various modes, such as standard mode and enhanced mode will be described in greater detail below.

Figure 2D:
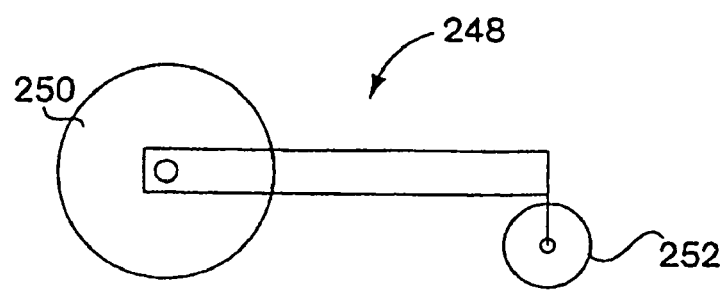

FIG. 2D shows an alternative embodiment of a cluster 248 for a human transport device 200. In this embodiment, the cluster 248 includes a first wheel 250 that may be driven by a motor (not shown). The commands which drive the motor may be received from the control unit 240 (FIG. 2A). The cluster 248 may also include a second wheel 252 which is not driven by a motor. For example, the second wheel 252 may be a caster type wheel which is fixedly attached to the cluster 248. Although the previous figures have described with the direction of forward travel being from left to right, it should be understood that the cluster 248 of FIG. 2D may be oriented in either direction. That is, the motorized wheel 250 may be the front wheel or the second wheel 252 may be the front wheel.

Figure 2E:
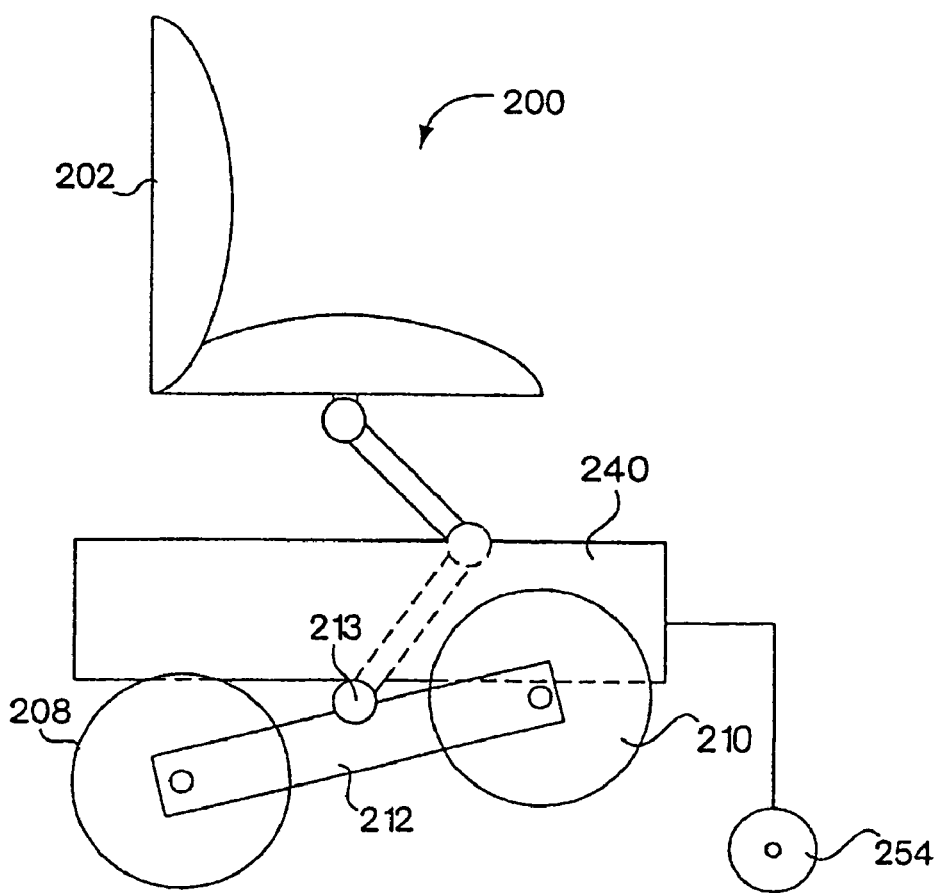

FIG. 2E shows an example of a transport device 200 that includes a non-motorized wheel 254 fixedly attached to the control unit 240 of the transport device 200. In this embodiment, the cluster 212 may be rotated, in one operational mode, so that the rear wheel 208 remains in contact with the surface and the front wheel 210 does not contact the surface. Assuming that no stabilization occurs, the torque due to the rotation of cluster 212 may cause the transport device 240 to tip forward until the non-motorized wheel 254 contacts the surface. This operational mode may be preferable when the transport device 200 is operating on a smooth, flat surface. The advantage comes from the fact that in this orientation only the rear wheel 212 needs to be driven by a motor and thus, the amount of power the transport device 200 consumes may be reduced.

Figure 2F:
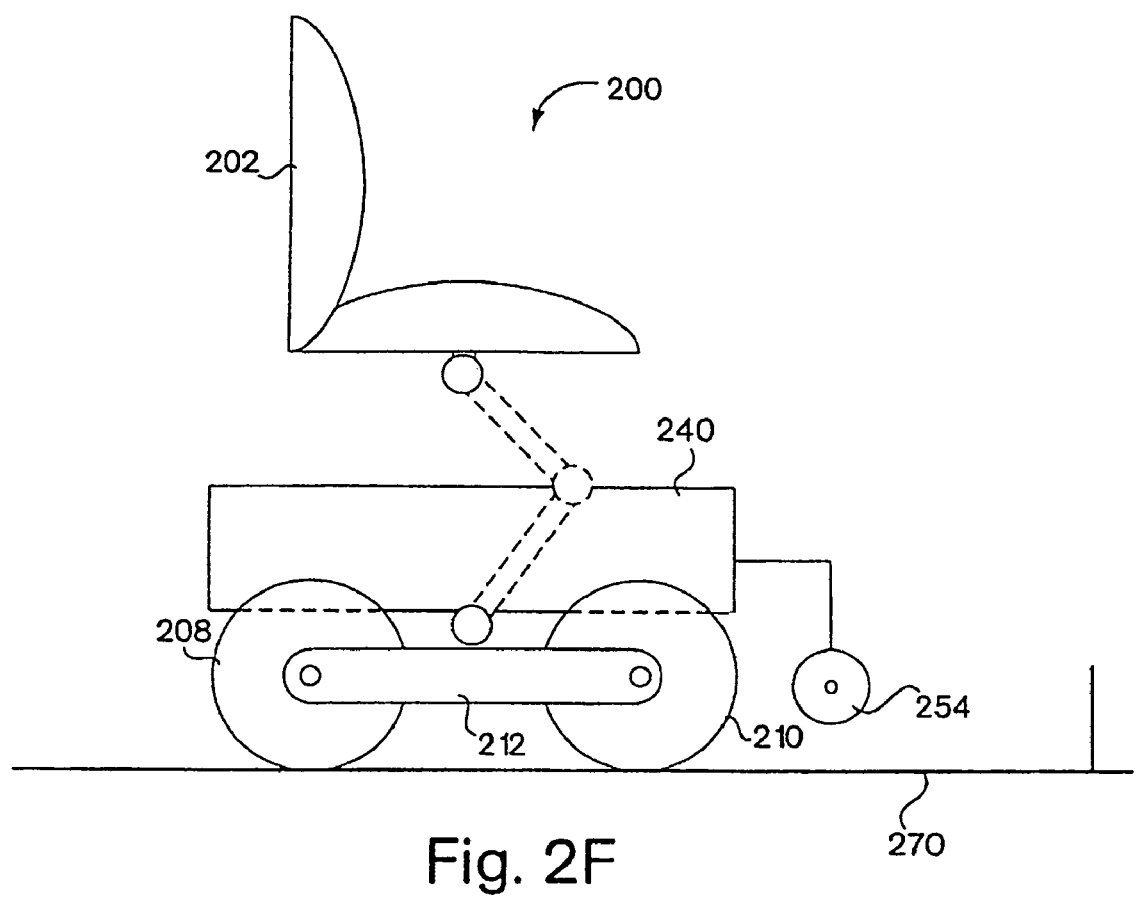

If the cluster 212 is rotated such that both of the wheels attached to the cluster, 208 and 210, contact the surface, the non-motorized wheel 254 may be lifted from the surface and the transport device may become a 4-wheel driven device. An example of a transport device 200 in such a configuration is shown in FIG. 2F. In FIG. 2F wheels 210 and 208 contact the surface 270. The non-motorized wheel 254 is elevated above the surface 270. In this embodiment, the cluster 212 and the platform 202 are substantially parallel to the surface 270. The foregoing discussion detailed various embodiments of a human transport device 200. It should be noted that the wheels 208 and 210 may be motorized wheels that are each driven by an individual motor. However, the wheels 208 and 210 may both be driven by a single motor. In addition, only one of the wheels may he driven by a motor. Furthermore, the transport device 200 has been shown only in side view. It should be understood that elements shown in side view may be mirrored on the other side of the transport device 200. For instance, the transport device may include a cluster on each side of the transport device 200. In one embodiment the clusters may be statically linked together so that they move as a unitary member. However, it is within the scope of the present invention that the clusters may be rotated or otherwise translated such that each cluster operates independently from the other. It should further be noted that the present invention is not constrained to being implemented in the transport devices described above. For instance, portions or the entirety of the teachings contained herein may be implemented in transport devices such as helicopters, airplanes, automobiles, off-road vehicles, motorized bicycles, motorcycles, and the like. Another type of transport device in which the teachings of the present invention may he implemented is shown in FIG. 3.

Figure 3:
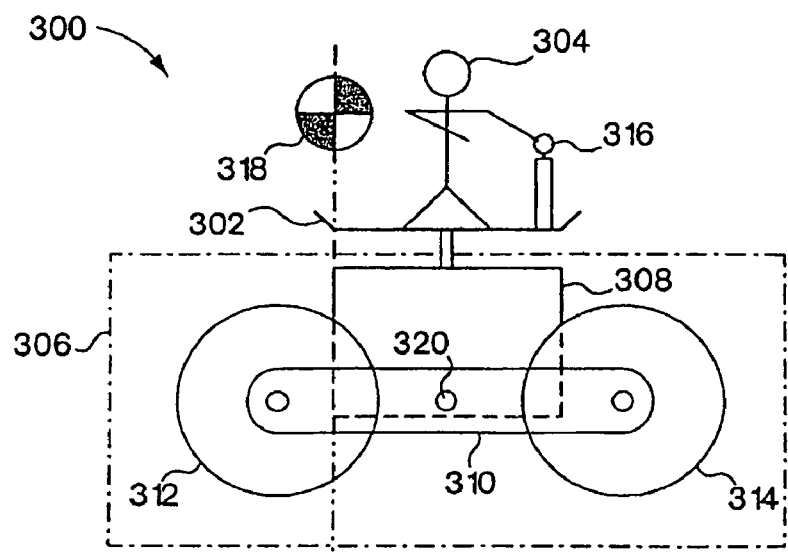
FIG. 3 illustrates another embodiment of a human transport device.

FIG. 3 shows a human transport device 300 upon which a user may stand. The transport device may include a platform 302 suitable for supporting a human user 304 in a standing position. In one embodiment, the motion of the device 300 may be controlled by the human 302 leaning on the platform 302 in the desired direction of motion. In this embodiment, the platform 302 may he pivotally attached to a base unit 306. The base unit 306 may include a control unit 308 which may control the motion and, possibly, the stabilization of the transport device 300. The base unit 306 may also include a cluster 310 which includes ground contacting members such as wheels 312 and 314. The human transport may also include a second user input device Such as a joystick 316 for receiving desired motion commands from the user. As shown in FIG. 3, the human transport device 300 includes both a lean platform 302 and a joystick 316.

More specifically, the platform 302 or the joystick 316 provide inputs to the control unit 308 to allow the user to direct the motion of the transport device 300. In response to the user inputs the control unit 308 may cause either or both of the wheels (312 and 314) and the cluster 310 to rotate. In addition, the control unit 308 may ad just, sometimes independently of the user input, the cluster's 310 position and/or the position of wheels 312 and 314 in order to keep the center of gravity 318 vertically over the footprint of the transport device 300. As shown in FIG. 3, the center of gravity 318 is vertically displaced over the cluster 310 between the axis of the wheels 312 and 314. In one embodiment, the control unit 308 maintains the center of gravity 318 above a center point 320 of the cluster 310. When the center of gravity 318 is located above the center point 320 of the cluster 310, the transport device 300 may be very stable.

For convenience, portions of the following description will refer to the location of the center of gravity as being known. However, the location may, in some instances, be based upon an estimate of the location. Systems and methods for estimating the center of gravity are discussed below. Furthermore, it should be noted that while the center of gravity is discussed as a reference quantity, the teachings herein are not so limited and may need only to consider other characteristics of the transport device in order to effectively stabilize the transport device. For instance, a consideration of only the pitch rate (discussed below) could supplant the need to rely upon an estimate of the location of the center of gravity.

Figure 4:
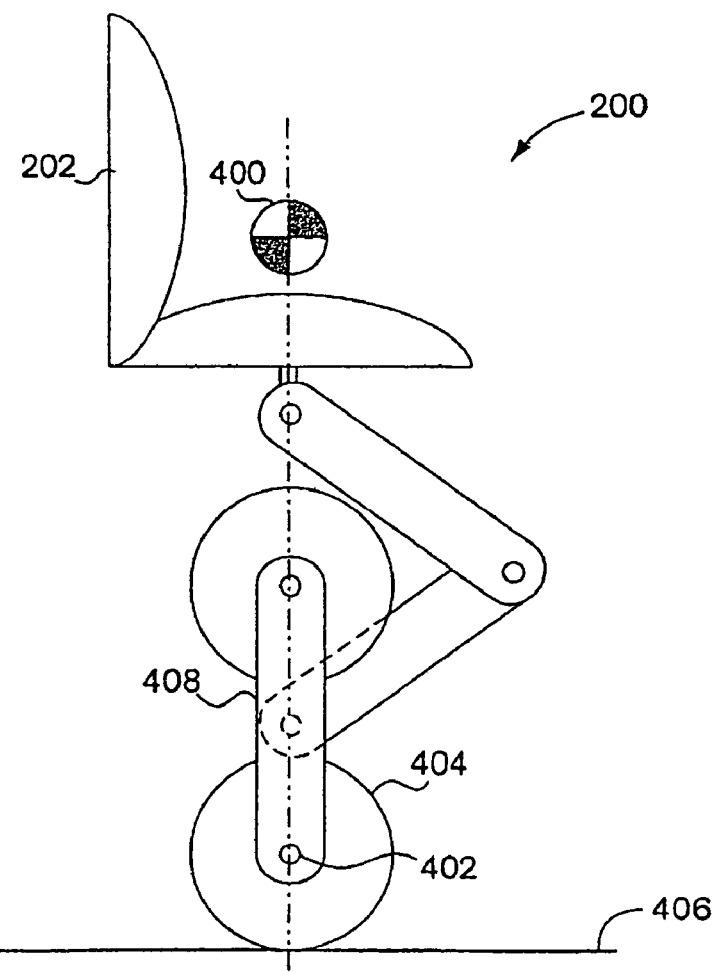
FIG. 4 illustrates a simplified version of the transport device shown in FIG. 2A.

FIG. 4 shows a simplified version of the transport device 200 shown in FIG. 2. In this example, the transport device is operating in a so called "balance mode" (other embodiments, like the examples of FIGS. 2-3 may also be operated in a balance mode). In balance mode (when the transport device is stationary), the control unit, based on various inputs, attempts to keep the center of gravity 400 over the transverse axis 402 passing through the surface contacting wheel 404. In this mode, substantially all stabilization is effected by rotating the surface contacting wheel 404 in order to keep the center of gravity 400 vertically disposed over the transverse axis 402 of the surface contacting wheel 404. To this end, the cluster 408 may be held in a fixed position relative to the bottom of the platform 202. In the embodiment shown in FIG. 4, the cluster 408 is held in a substantially vertical position (The cluster could also be held at other relative angles.)

Again, the transport device 200 in balance mode, operates by controlling the position of the platform 202 so that the center of gravity 400 is vertically displaced at some location above the transverse axis 402 of the surface contacting wheel 404 upon which the transport device 200 is resting. To allow for motion, the center of gravity 400 may be slightly displaced either in front of or behind the transverse axis 402 of surface contacting wheel 404 so that the device begins a controlled fall in the "FORE/AFT" direction. As the center of gravity 400 is displaced relative to the transverse axis 402, the surface contacting wheel 404 is driven to, in essence, keep the center of gravity 400 in a relatively close, but still offset, location as compared to the axis 402. In this manner, the device does not fall over. Balance mode for a transport device such as that shown in FIG. 4 is disclosed in U.S. Pat. No. 5,701,965. In this embodiment for balance mode, the cluster 406 is locked in position and may not be rotated in order to help stabilize the transport device 400. Thus, in this embodiment, balance mode may be generally thought of as a "wheels only" approach to dynamically stabilizing a human transport device.

In some instances, it may be desired to have a human transport device climb or descend stairs with little or no assistance from the user or any other outside help. Thus, some human transport devices have developed the capability to climb stairs and operate in a so called "stair" or "lean" mode. Examples of such devices are shown U.S. Pat. Nos. 5,701,965 and 5,791,425. Stair mode may include having the wheels "slaved" to the cluster. That is, the wheels may only move in order to allow the cluster to rotate but not as a means of locomotion.

Figure 5A:
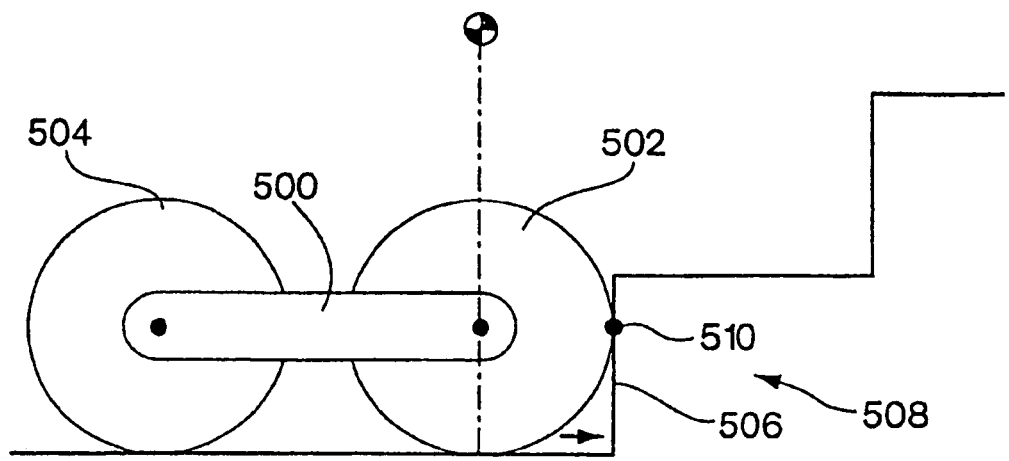
FIGS. 5A and 5B illustrate the relative orientation of a cluster of a human transport device operating in a stair mode.
Figure 5B:
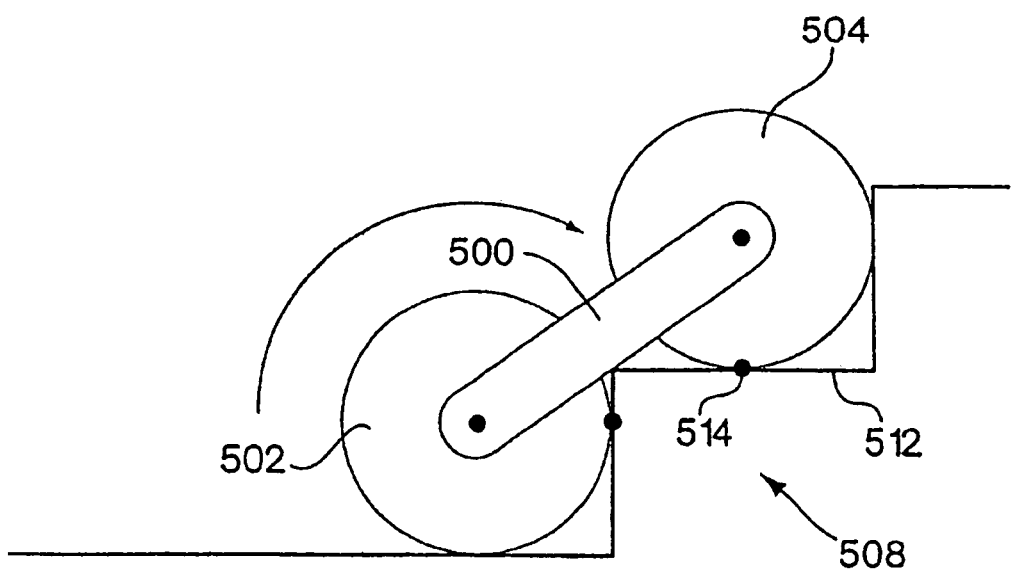

FIGS. 5A and 5B show two examples of the relative orientation of a cluster 500 of a human transport device operating in stair mode. When operated in stair mode, the cluster 500 may be rotated so that the center of gravity is over either a rear wheel axle or front wheel axle depending upon which direction the stairs are being traversed (i.e., whether going up or down stairs). When the wheel 502 contacts the front edge 506 of a stair 508 the wheel is held against the stair. As the center of gravity is moved toward the contact point 514, the cluster 500 may begin to rotate upward as shown in FIG. 5B. As the cluster 500 is rotated, the slaved wheel 502 may be rotated in relation to the cluster 500 in response to the cluster rotation so that the same point oil the wheel remains in contact with the stair at contact point 510. If the wheel 502 was allowed to move, the rotation of the cluster may cause the wheel 502 to move away from the step and cause the transport device to fall over.

The cluster 500 is rotated (in this example, clockwise) until the second wheel 504 is in contact with the top edge 512 of the stair 508 at contact point 514. This process is repeated until the transport device reaches the top of the stairs. In another embodiment, the process described may need only he conducted once if, for instance, the transport device is traversing a large curb.

The systems described above use either the clusters or the wheels in order to affectively maintain the balance of the device. However, it has been discovered that in some instances, utilizing, both the wheels and the clusters in order to keep the center of gravity in a position such that the user does not fall over is more desirable. For example, when traversing a bumpy surface, it may be desirable to rotate the wheels and the cluster at the same time in order to keep the platform in an erect position.

Thus, aspects of some embodiments of the present invention are directed to a new mode of transport control. This new mode shall be referred to herein as enhanced mode. In one embodiment, enhanced controls the operation and stabilization of a transport device by controlling both the wheels and clusters of a transport device such that the center of gravity is located, or will very shortly be located, at a position over the footprint of the transport device (or some other measure met, such as keeping the frame pitch (or function of the frame pitch) of the transport device within a range of parameters).

Figure 6:
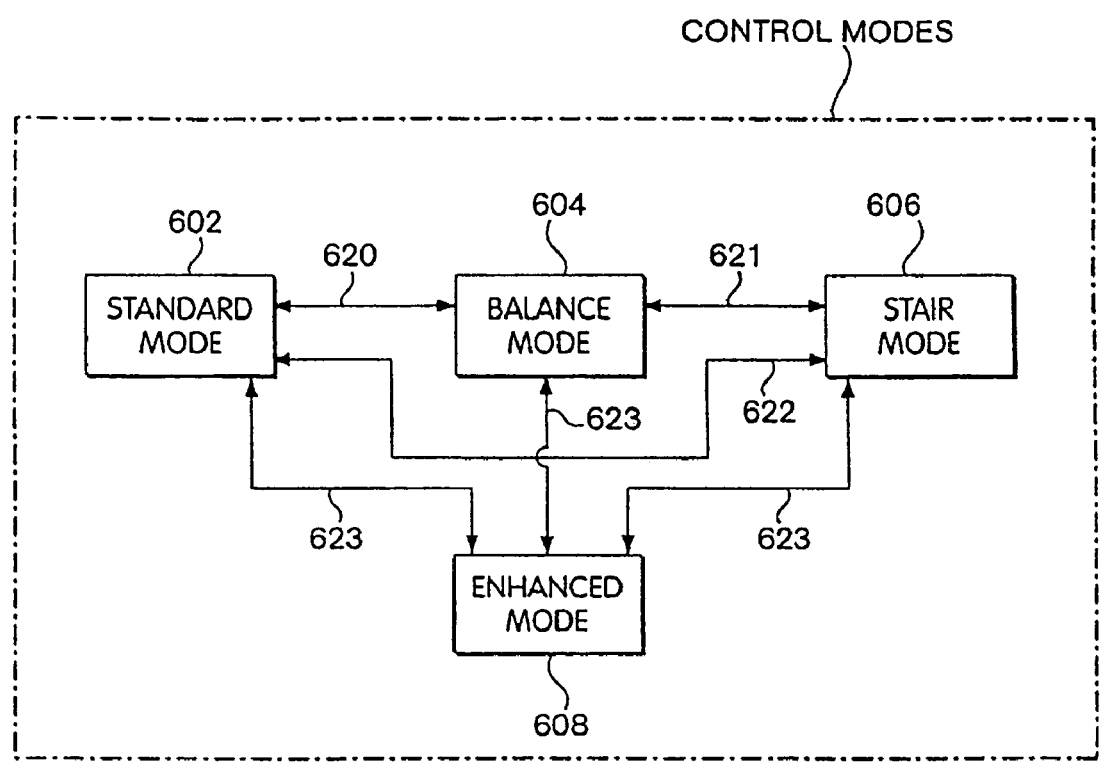
FIG. 6 illustrates a block diagram of possible operational modes of a human transport device.

FIG. 6 is a block diagram detailing possible operational modes of a human transport device. In one embodiment, the human transport device may include a standard mode 602, a balance mode 604, and a stair mode 606. According to aspects of certain embodiments of the present invention, the transport device may also include an enhanced mode 608. These various control modes are used by software and hardware contained in a control unit in order to provide locomotion for the device. Each mode causes the human transport device to operate according to different parameters. It should be noted that human transport devices may include other operational modes. For example, a human transport device may include a mode for transferring between modes and a mode for dealing with system failures.

The control modes and associated software and hardware discussed herein may be included in a control unit, such as the control unit described above with respect to FIG. 3. However, the various portions of the software and hardware may utilized in locations other than a control unit. For instance, various sensors could be located on the platform, the cluster, the wheels, or any other location where they may be desired or needed in order to effectively control the operation of a human transport device.

Balance mode 604 and stair mode 606 were discussed above and for the purposes of the example embodiment of FIG. 6 may be presumed to operate in accordance with the above descriptions. However, it should be noted that variations to balance mode 604 and control mode 606 may exist and may be fully integrated into a transport device operating under the various control scenarios provided herein.

Standard mode, as the term is used herein, shall refer to a mode of operation where no dynamic stabilization occurs. In standard mode, the cluster and the platform remain in a fixed relationship to one another. For instance, if a user is operating a human transport device having a chair like platform (FIG. 2) in standard mode, a motor that controls the angle of platform relative to the cluster is held at a constant position. If the transport device is traversing up an incline, the platform tilts back. However, if the incline becomes too steep, the center of gravity of the system may lie in a location that is outside the footprint of the transport device and may cause the transport device to tip over backwards.

In standard mode, the user may have complete control of the motion of the transport device. That is, the control unit is highly sensitive to user inputs. In one embodiment, this may be accomplished by applying high gain coefficient (discussed below) to inputs received from a user input. The user input may he a joystick or other suitable input device actuated by a user. In addition, the transport device may include a lean-able platform that serves as a user input.

According to certain embodiments, standard mode may include two sub-modes. A first sub-mode may be implemented in a system such as shown in FIG. 2E. In this sub-mode, non-motorized wheels 254 may be fixedly attached to the control unit 240 of the transport device 200. The cluster 212 may be rotated about an rotation point 213 at least until the device is pitched forward such that the non-motorized wheels 254 wheels contact the surface. In this mode, power is provided to a motor which drives the rear wheel 208 in order to provide motion in response to a user command. In this manner, power may be conserved because any motors attached to the forward drive wheels (e.g., wheel 210) of the cluster 212 may be powered down. For this reason, standard mode in general and this sub-mode in particular is especially attractive when a transport device 200 with a limited power supply (i.e., a rechargeable battery) is to be operated for extended periods of time. In addition, in this mode, any type of stabilization that may be provided by the transport device may be disabled in order to conserve energy. Also, due to the non-motorized wheels, which may be caster type wheels and have high maneuverability, the turning radius in this mode may be minimal. Additionally, each wheel connected to opposing sides the cluster 212 may include its own wheel motor. By applying a differential signal to each of the opposing wheels, the transport device 200 may be able to spin in a circle. This may be accomplished by providing a positive torque to one wheel and a negative torque to the other.

Another sub-mode of standard mode include a mode where the cluster is rotated such that all four wheels contact the surface which the non-motorized wheel 254 is held off the surface as shown in FIG. 2F. In this sub-mode, the transport device 200 may function as a four-wheel drive transport device. However, it is preferred that the wheels do not respond to user input commands in this mode so that a user does not confuse this sub-mode of standard mode with the enhanced mode discussed below.

As discussed above, standard mode may hold the platform in a substantially constant angular relationship to the cluster. In this case, the motor which positions the cluster with respect to the platform may be disabled during either sub-mode of standard mode.

Referring now back to FIG. 6, the user may transition from one mode to another by selecting options presented to the user on a user interface. The user interface may be provided on, for example, an arm 204 included on the platform 202 (FIG. 2A). Alternatively, modal transitions may be affected automatically. For instance, if the power supply is low, the transport device may transition from balance mode to standard mode automatically in an effort to save power or ensure safety.

The transport device may transition from various modes to other modes. For instance, the transport device may transition from standard mode 602 to balance mode 604 and back as represented by arrow 620. The transport device may also transfer from balance mode 604 to stair mode 606 and back as represented by arrow 621. In addition, the transport device may transfer from standard mode to stair mode 606 and back as represented by arrow 622. The transport device may enter and exit enhanced mode 608 from any of standard mode 602, balance mode 604, or stair mode 606 as represented by arrows 623, when the user selects the modal transition from a user input device. Enhanced mode, as will he demonstrated below, may be more dynamically stable than any of the other modes of the transport device. As such, the transport device may enter enhanced-mode automatically if the control unit determines that the transport device has become unstable in its current operational mode.

According to some embodiments, automatic entry into enhanced mode may be prevented when the cluster is in a substantially vertical orientation. Exiting enhanced mode may be accomplished at almost any time unless some parameter of the current orientation of the transport device is such that the transport device would become unstable if a mode change occurred.

As also discussed below, enhanced mode may include a plurality of sub-modes from which it may switch automatically. In addition, enhanced mode may switch between the sub-modes in a smooth and effective manner due to the control switching and gain scheduling systems and methods described below.

Figure 7A:
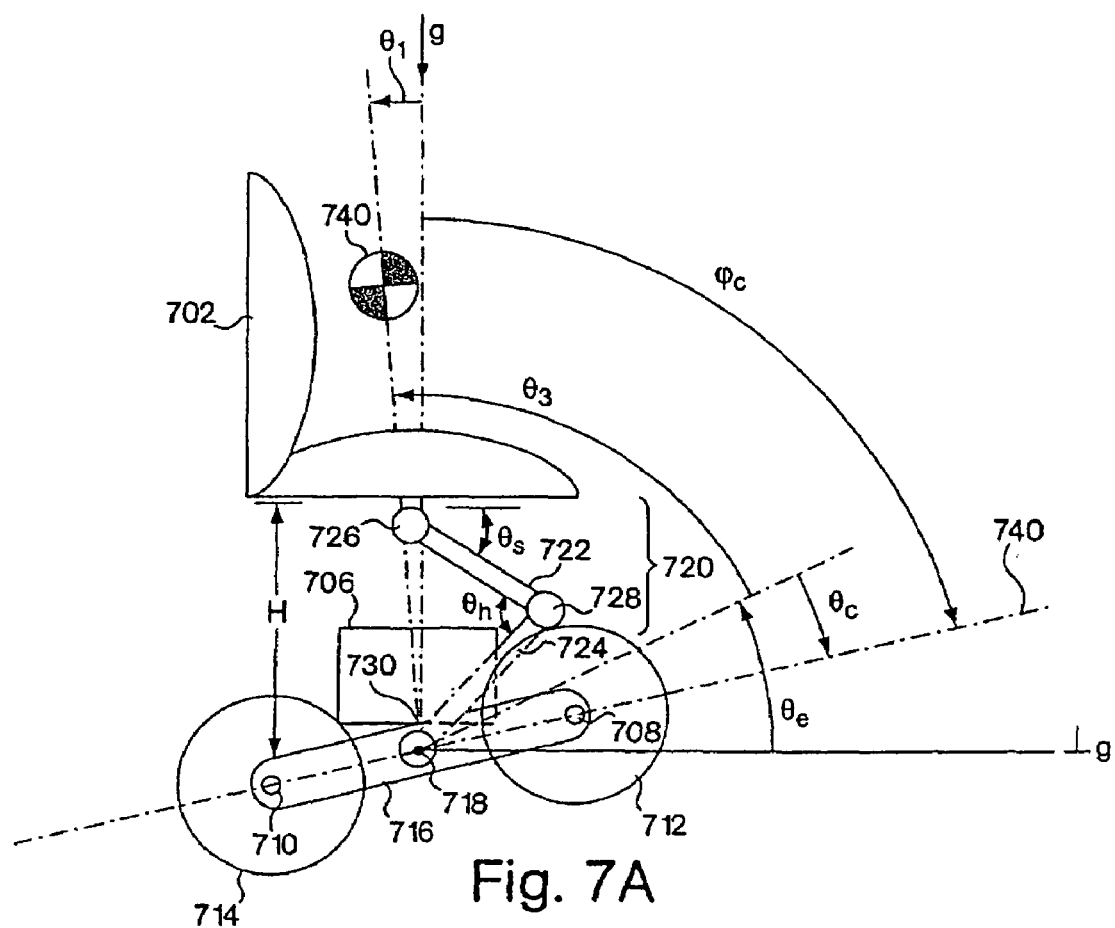
FIG. 7A-7B illustrate a simplified side view of a transport device.

FIG. 7A shows a simplified side view of a transport device 700 which may operate in enhanced mode. Note that the transport device 700 is given by way of example only and in no way serves to limit the application of the operation of an enhanced mode as described herein. The transport device 700 may include a platform 702. As discussed above, this platform 702 may be a chair type platform as shown in FIG. 2A or alternatively may be a platform upon which a user stands as shown in FIG. 3. However, the description of the relative angles of the transport device in enhanced mode are equally applicable to either configuration and other configurations as well. For purposes of the following discussion, any angles are measured in FIG. 7A such that an angle represented by an arrow pointing in the clockwise direction is given a positive value and any angle represented by an arrow pointing in the counter-clockwise direction is given a negative value. For example, the angle shown as $\phi_c$ (cluster position with respect to gravity) is a positive angle and the angle denoted as $\theta_3$ is a negative angle.

The center of gravity 704 represents the center of gravity of the entire system. This includes the transport device 700, the user (not shown), and any payload which the user may be carrying (also not shown). Again, it should be noted that the center of gravity is given as only one example of a parameter of the transport device which may be estimated and/or examined in order to determine the stability of the transport device.

The control signals provided by the control unit 706 attempt to keep the center of gravity 704 over the footprint of the transport device 700. Again, the footprint of the device may be defined as existing between the endpoints of the cluster and more preferably is between the transverse axes 708 and 710 of the front 712 and rear wheels 714. These wheels may be attached to and part of the cluster 716. In one embodiment, the center of gravity remains located over a center point 718 of the cluster 716 in enhanced mode.

The platform 702 may be supported by a platform support 720. The platform height (H) as used herein shall refer to the distance between the bottom of the platform 702 and the location where the seat support 720 is connected to the cluster 716.

By varying the angle $\theta_h$ between the upper portion 722 and the lower portion 724 of the platform support 720, the seat height H may he adjusted. A motor may he included at the pivot point 728 where the upper portion 722 and lower portion 724 are pivotally connected. This motor, based on seat height commands, may clause the angle $\theta_h$ between the upper portion 722 and the lower portion 724 to increase or decrease. This is advantageous in that it allows the user to raise to (or be closer to) eye level with a standing human. In one embodiment, the platform 726 and the upper portion 722 may also include a motor that sets an angle $\theta_s$ such that the bottom of the platform 702 remains substantially horizontal regardless of the orientation of the upper portion 722.

Figure 9:
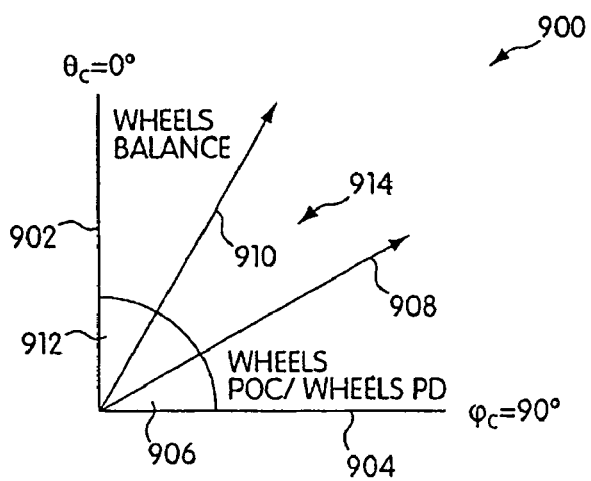
FIG. 9 illustrates a graphical representation of example values which may be used to switch modes according to aspects of the present invention.
Figure 10:
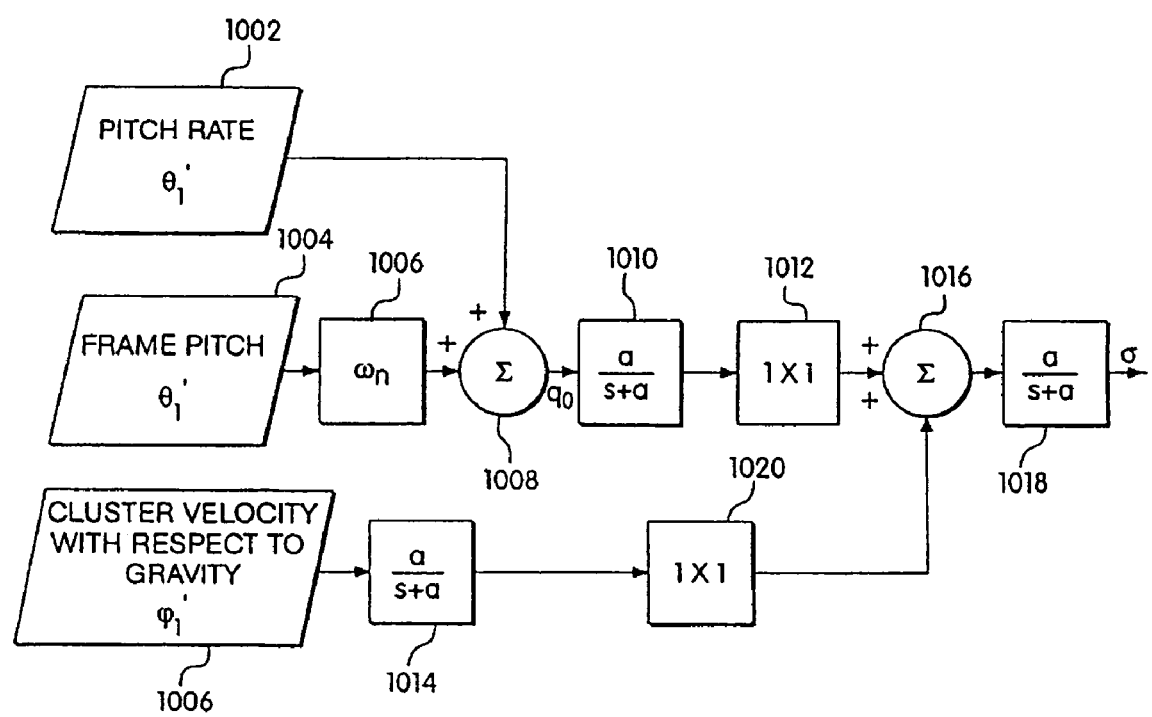
FIG. 10 illustrates a dataflow diagram of one embodiment by which a control switch value may he determined.
Figure 11:
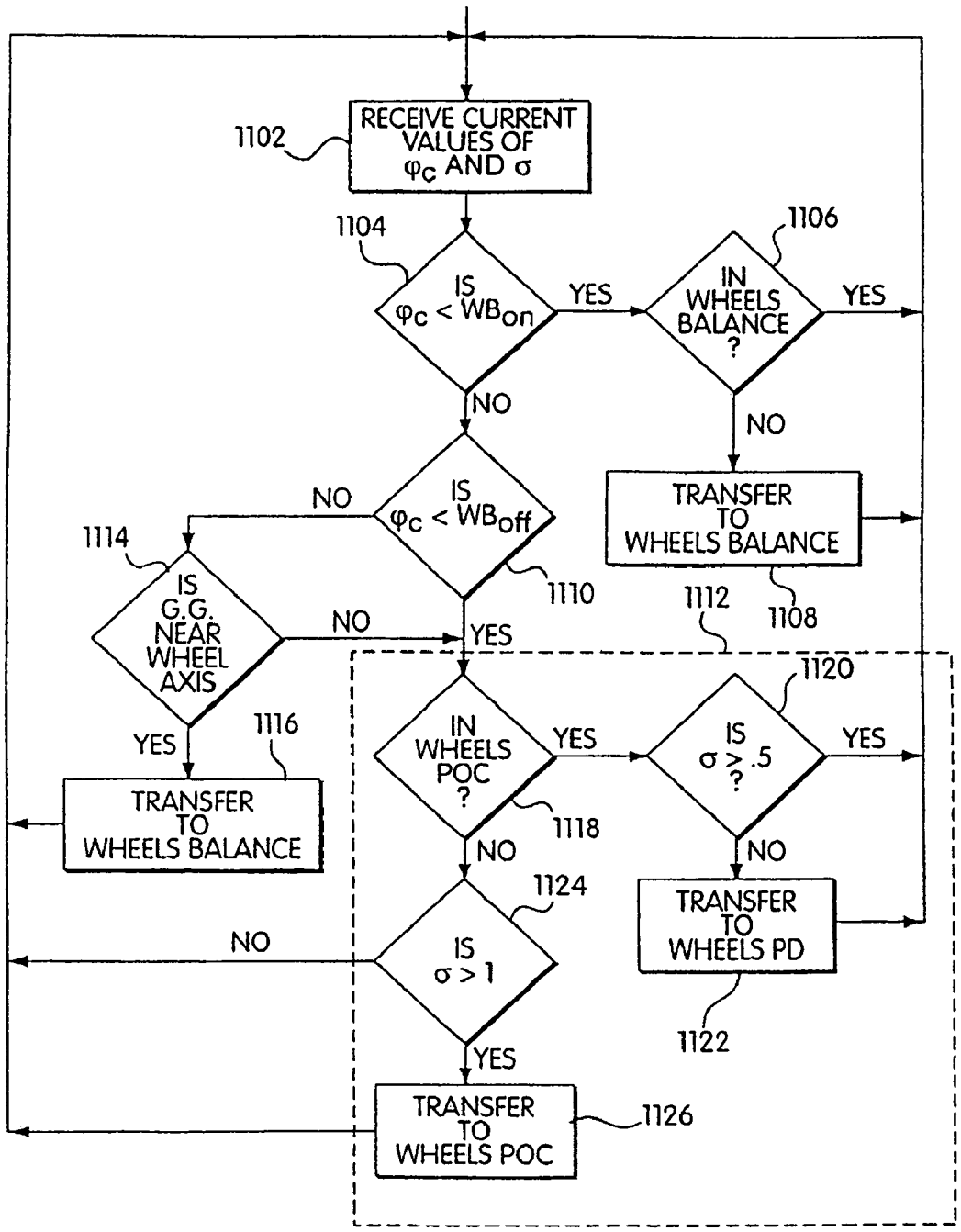
FIG. 11 illustrates, in flow chart form, a method of determining when to transfer between various sub-modes of a transport device.

In another embodiment, as disclosed in FIGS. 9-11 and related discussion in U.S. Pat. No. 5,791,425 which is hereby incorporated by reference, the platform holder 720 may be an articulated arm having upper and lower portions that may be adjusted with respect to each other and the platform. The adjustments may be achieved by motorized drives located at the contact pivot points 726, 728 and 730 (where the lower portion 724 may be pivotally connected to the cluster 716). The motorized drives may connected to one another (for example, by belts) such that change of position in one motor connected at the pivot point 728 between the upper and lower portions causes a corresponding change in the angle $\theta_s$ between the platform 702 and the upper portion 722 to change such that the bottom of the platform 702 remains substantially horizontal.

The reason that the seat height is important to the operation of the human transport device 700 is it least two-fold. First, the seat height H may be used in order to estimate the center of gravity 704 of the entire system. In addition, the seat height may affect how rapidly the center of gravity may be moving relative to a vertical axis defined by gravity (g). If the seat is higher, the center of gravity may move slower in response to a disturbance. Thus, the seat height may be a variable considered when controlling the dynamic stabilization of the transport device. For instance, the seat height may be an input that affects the magnitude of particular gain coefficients (discussed below) that are utilized in order to control and otherwise stabilize the transport device.

The amount by which the center of gravity 704 is offset from a vertical axis passing though the cluster 716 shall be referred to herein as "frame pitch" and is denoted a $\theta_1$ in FIG. 7A. This frame pitch may be a "rotational" pitch based upon an angular displacement. As shown, the vertical axis passes through a center point 718 of the cluster 718. However, it should be noted that in enhanced mode the vertical axis may pass through any portion of the cluster disposed between the transverse axes passing thought the center of either wheel 714 or wheel 712 (e.g., the footprint). In the case where it is desired that the axis passes through a portion of the cluster 716 that does not pass through the center point 718, the stabilization control processes discussed below may be altered to take into account the distance where the vertical axis passes through the cluster 716 is from the center point 718 or the cluster 716.

Note should be taken that the control objective of placing the center of gravity 704 over the center point 718 of the cluster 716 may not be applicable to other modes of operation of the transport device. For example, in balance mode, the control objective may be to keep the center of gravity 704 in an appropriate relationship over a transverse axis passing through one of the wheels of the cluster 716.

As discussed above, the location of the center of gravity 704 may be based upon an approximation which relies upon the seat height. The location of the center of gravity 704 may also be determined based on the rate at which the platform is moving with respect to gravity. This rate will be referred to herein as the pitch rate. For instance, motion sensors (not shown) disposed on the transport device 700 may sense that the system is pitching forward at a high rate. This motion will displace the center of gravity 704, in some instances, such that it lies outside the footprint of the transport device 700. Thus, the footprint of the device may need to be moved with respect to the surface in the direction of the pitch rate such the footprint remains beneath the center of gravity 704.

FIG. 7A also shows a control unit 706. The operation of the control unit 706 is discussed below. The control unit 706 may include various motion sensors that determine, for example, the pitch rate of the system. The sensors are not limited to any particular type of sensor and could be, for example, an accelerometer, a position sensor, a "level" sensor, and the like. As one will readily realize, the pitch rate may be determined empirically by differentiating the measured or estimated frame pitch $\theta_1$ with respect to time. The control unit 706 may also include various hardware and software that may control the motors attached to the wheels 712 and 714 as well as a motor attached to the cluster 716. In addition, the control unit 706 may also include various control loops discussed below that may serve to stabilize the transport device 700.

In one embodiment, the control unit 706 may have the cluster 716 pivotally attached thereto. Thus, a variation in the angular orientation of the cluster 716 with respect to vertical may not effect the same change in orientation of the control unit 706. The difference between the angle by which the top of the control unit 706 is displaced from horizontal (denoted as controller angle $\theta_c$) and the angle by which the cluster 716 is displaced from vertical ($\phi_c$, which represents the cluster position with respect to gravity) shall be referred to herein as the relative cluster position and is denoted as angle $\theta_c$. The angle $\theta_c$ represent the angular orientation of the top of the control unit 706 with respect to the center of gravity 704.

Again, the general purpose of enhanced mode is to attempt to place the center of gravity 704 at a location that is relatively within the footprint of the transport device 700. In some embodiments, enhanced mode may attempt to place the center of gravity 704 over the center point 718 of the cluster 716. This embodiment may be thought of generally as stabilization that attempts to place all four wheels of the transport device 700 on the ground with the center of gravity located vertically above the center point 718 of the cluster 716. When this condition is met, the transport device 700 is in a substantially stabilized position. In addition, it may be preferred to keep the bottom of the platform 702 substantially parallel to the horizontal. If the bottom of the platform 702 is substantially parallel to the horizontal, the user may feel more stable and the user may be, therefore, more comfortable.

A longitudinal axis 740 of the cluster 716 is shown being angularly displaced from the horizontal. However, the bottom of the platform 702 remains substantially parallel to the horizontal. This condition may occur, for example, when the transport device 700 is traversing all inclined plane. In order keep the center of gravity 704 within the foot print of the transport device 704, the angle between the cluster 716 and the lower portion 724 needs to be reduced. This reduction may be accomplished by a motor connected to the pivot point 730 that rotates the cluster 716 in the counter-clockwise direction and forces the lower portion 724 forward.

As discussed above, in some circumstances providing only cluster stabilization routines may not effectively balance the transport device if the cluster displacement from vertical (i.e., $\phi_c$=0) becomes too small. In some embodiments, it is also possible to maintain balance by using the rotation of the wheels to help place the center of gravity above (or in an appropriate relation to) the footprint of the device. In addition, it has been discovered that balancing on two wheels may diminish the usability of the transport device. For instance by balancing only on two wheels, it may be difficult to negotiate over uneven surfaces. For example, to traverse up and over a curb on such a two wheel device, the amount of torque that needs to be applied to the wheels in order to essentially lift the transport device directly upwards may be excessive. When all of the torque is applied to raising the wheels up a vertical surface, the control required to keep the transport device in a substantially vertical position may be severely hampered.

Enhanced mode, according some embodiments, can address these problems. Enhanced mode utilizes portions of both wheel balancing techniques as well as cluster balancing techniques in an effort to keep the center of gravity located vertically above the region defining the footprint of the transport device. Utilization of both cluster and wheel balancing algorithms provides an inherently more stable transport device than the prior art when the transport device is traversing non-uniform surfaces.

In one embodiment, this new enhanced mode may include several sub-modes. For example, an enhanced mode may include a wheels PD ("proportional derivative") mode, a wheels POC (pendulum-on-a-cart) mode and wheels balance mode (the names being used as labels are not intended themselves a being limiting or descriptive). Each of these various sub-modes are applicable in different circumstances. In one embodiment, the present invention may transfer between these sub-modes depending upon the current operational characteristics of the transport device.

Given these objectives and the parameters (i.e., angles) defined with respect to FIG. 7A, the control unit may stabilize the transport device as it traverses many different types of surfaces. In one embodiment, the control unit may include a one or several control loops that implement gain coefficients in order to help stabilize the transport device. In another embodiment, the control unit may contain different control architectures for each mode.

Figure 8:
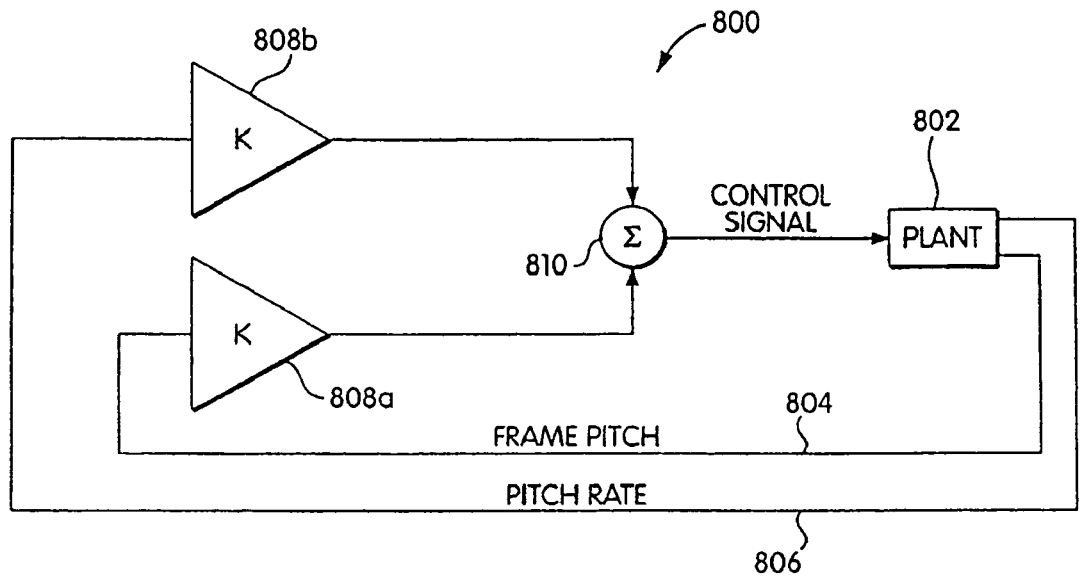
FIG. 8 illustrates an example of a control loop that may be implemented according to aspects of the present invention.
Figure 20:
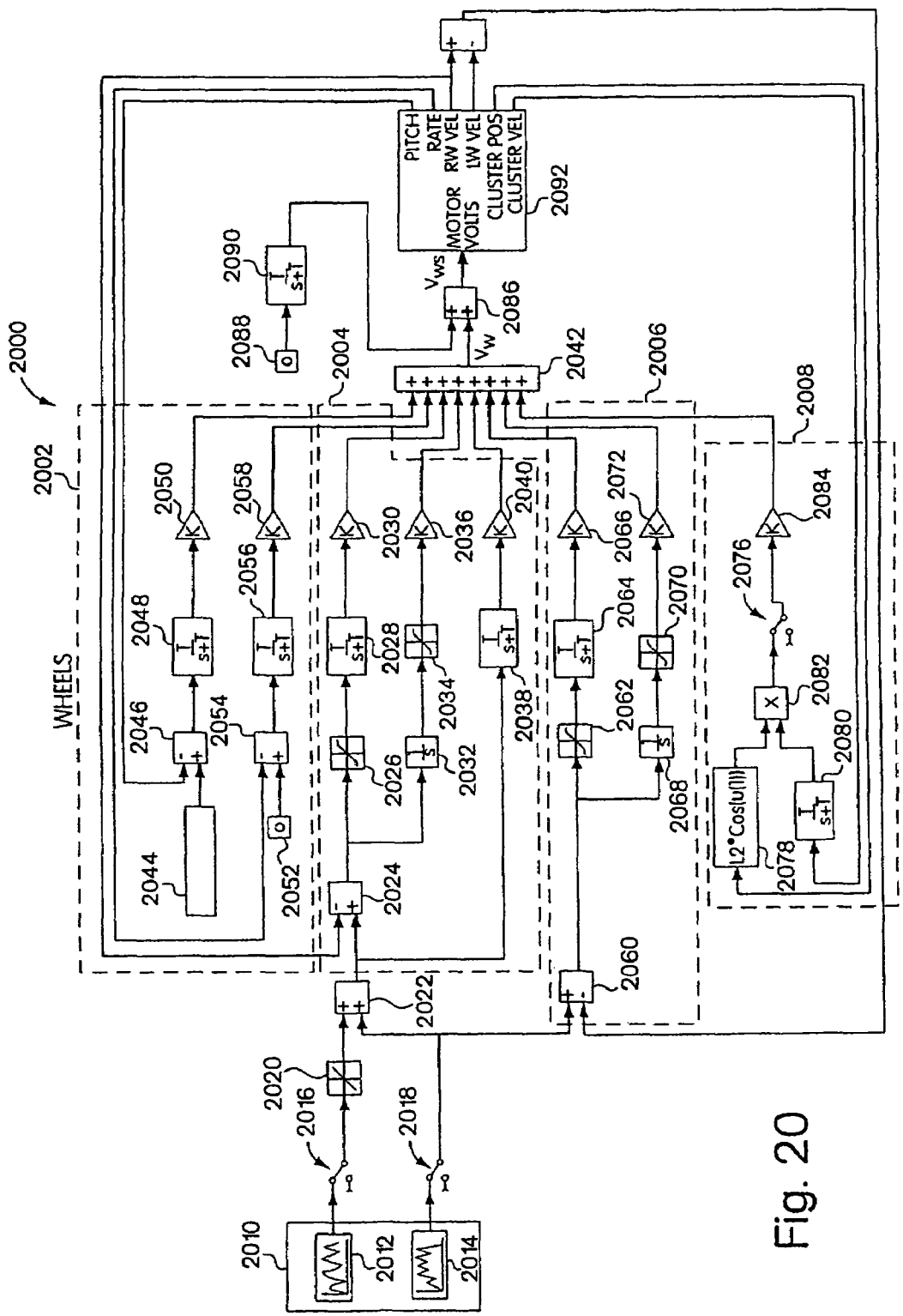
FIG. 20 illustrates an example of a control loop for controlling the position of the wheels of a transport device.
Figure 21:
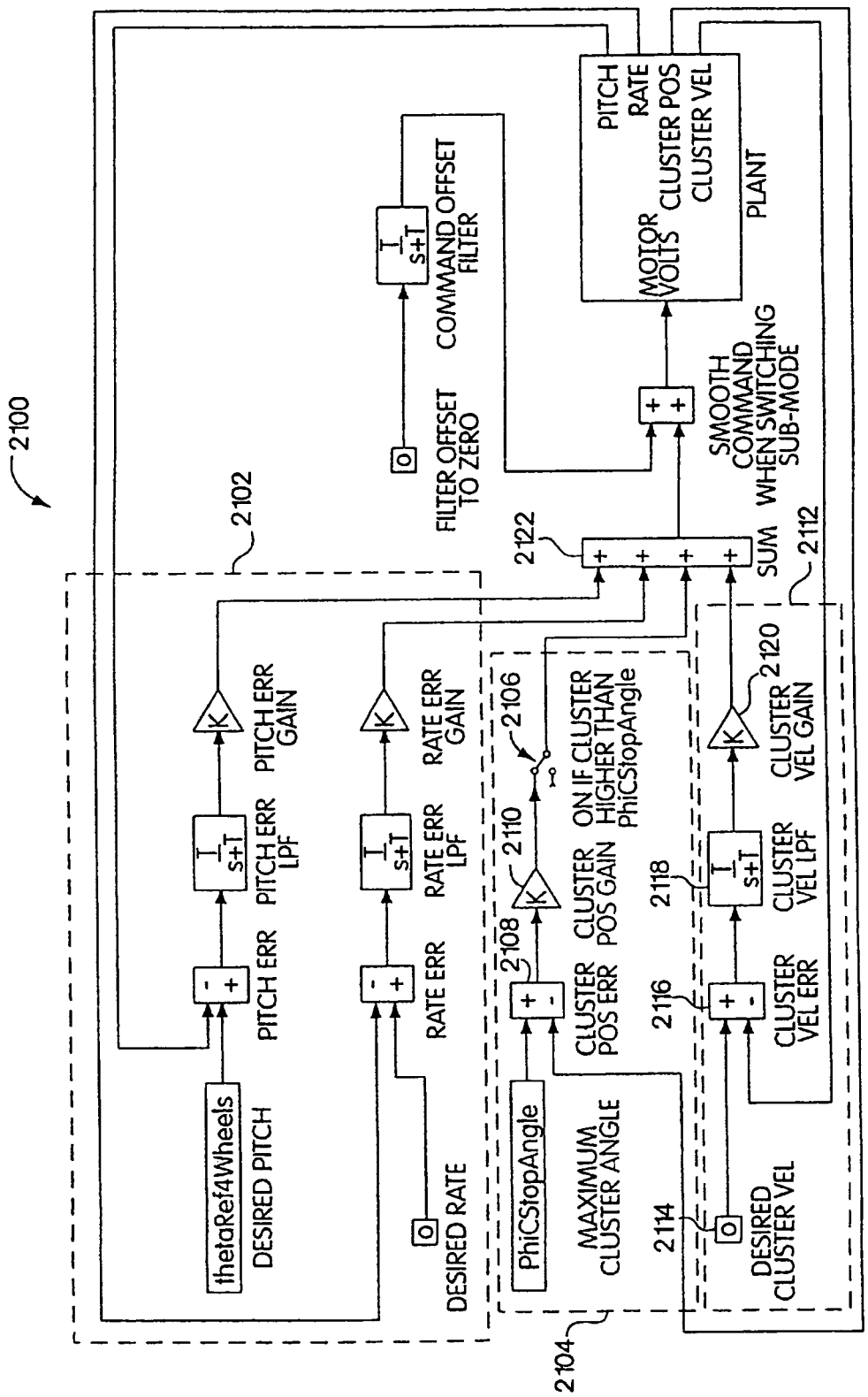
FIG. 21 illustrates an example of a control loop for controlling the position of the cluster of a transport device.

FIG. 8 is an example of a control loop 800 that may be implemented in the present invention. The control loop 800 may include a plant 802 which may include, for example, a motor and a plurality of sensors that monitor various parameters of a transport device. At least one, and in some cases several, parameters may be fed-back from the plant 802 into the control loop 800. For example, the frame pitch 804 and the pitch rate 806 of a human transport device may be fed-back. Each of the parameters may be multiplied by a gain coefficient (e.g., gain coefficients 808a and 808b) in order to produce a control signal (the output of summer 810) that is ultimately again applied to the plant. The higher the value of the coefficient that a given parameter is multiplied by, the more that parameter effects the value of the control signal. Further examples of control loops which may he applied to, a transport device are described in greater detail below (FIGS. 20 and 21).

Figure 7B:
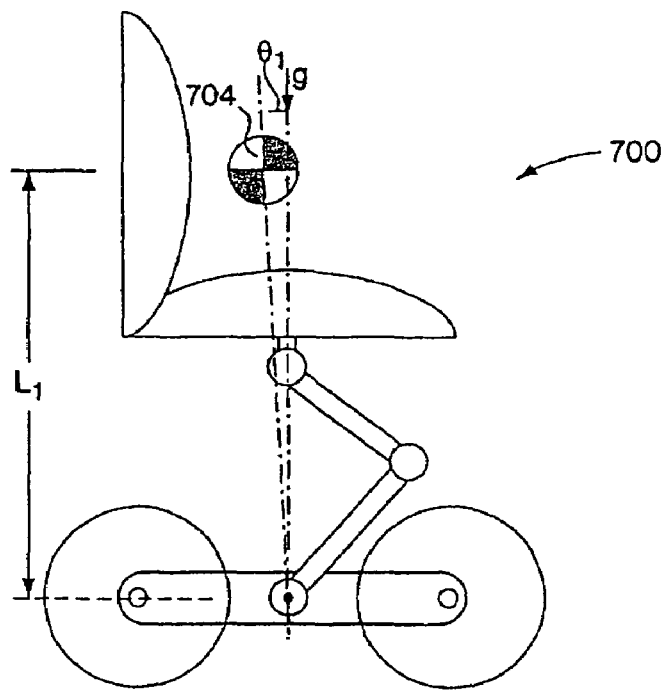

Referring again now to both FIGS. 7A and 7B, one way to model the operation of the transport device may be to model the system as an inverted pendulum pivoting at the cluster pivot joint 730. Of course, the system may be modeled in several other ways. The total energy (E) (including potential and kinetic) of the system may be expressed as:

$$E = \tfrac{1}{2}J(\theta_1')^2 - mgL_1(1-\cos\theta_1)$$

where J is the frame inertia (including the transport device, the user, and any payload), $\theta_1$ is the frame pitch, $\theta_1'$ is the pitch rate (the derivative of $\theta_1$ with respect to time), m is the frame mass, g is gravity, $L_1$ is the distance from the center of gravity 704 to the cluster pivot joint 730 (note, $L_1$ depends on platform height H). This formula may be simplified using the small angle approximation for cosine to:

$$E = \tfrac{1}{2}J(\theta_1')^2 - mgL_1\theta_1^2$$

The transport device 700 is most stable when the total energy is equal to zero. This may occur in at least two instances In a first instance, the frame pitch $\theta_1$ and the pitch rate $\theta_1'$ are equal to zero. In this instance, the transport device 700 may be completely still. In another instance, the frame pitch $\theta_1$ may be negative (FIG. 7B) while the center of gravity 704 is moving forward. If the center of gravity is moving forward at a pitch rate $\theta_1'$ sufficient to counter act the frame pitch $\theta_1$, the total energy may again be brought back to zero. Thus, it is desirable to define the relationship between the frame pitch $\theta_1$ and the frame rate $\theta_1'$ such that the above equation is equal to zero. If the above simplified energy equation is set to zero the following equation may be derived:

$$\theta_1' \pm \theta_1(mgL_1/J)^{1/2} = 0$$

This equation may equal zero in one of two instances. One is when the pitch term $\theta_1(mgL_1/J)^{1/2}$ is added to $\theta_1'$ and the other is when the pitch term is subtracted from $\theta_1'$. The positive solution indicates that the transport device is moving back towards vertical and the negative solution indicates that the machine is continuing to fall over even though the total energy remains equal to zero. Thus, the positive solution is selected in order to determine a balance indicator, $q_0$, which may be defined by the equation:

$$q_0 = \theta_1' + \omega_n \theta_1$$

where $\omega_n$ equals the natural frequency of an inverted pendulum $(mgL_1/J)^{1/2}$. It will be apparent from the foregoing, that the system is well balanced if $q_0=0$. Variations, either above or below zero, indicate that the transport device is not completely balanced and that various corrections should be applied. The value of $q_0$, as discussed below, may be used as a value which causes the transport device to transfer between various sub-modes in enhanced mode. Of course values other than $q_0$ could be used depending upon how the transport device is modeled.

Enhanced Mode

Again, one mode of operation for a transport device is "enhanced mode." Enhanced mode may (but need not) be applied to increase the ability to traverse non-level terrain such as ramps, gravel and curbs. The cluster and wheels are used together to provide dynamic stability. Enhanced mode may also (or instead) be used as a method for attempting to regain dynamic stability if balance mode is unable to maintain stability for some reason (i.e., loss of traction, inability of the wheels to roll, etc.).

Depending upon various conditions of the transport device, different sub-modes within enhanced mode may need to be implemented. These sub-modes will be referred to herein as follows.

The first sub-mode will be referred to as wheels PD mode. Wheels PD is a mode which responds to user commands for locomotion and is statically stable, and can handle mild variation in the surface being traversed. In wheels PD mode, the transport device may closely follow user commands. In some embodiments, this may allow users to drive on ramps, turn in place, and climb over various obstacles such as small bumps. The wheels PD controller may be typified in that the transport device when in wheels PD mode is very responsive to user inputs. This allows the user to have strong control of the locomotion of the transport device. In one embodiment, this may be accomplished by applying a high gain value to user input commands that are transmitted to the wheels. The high gain level applied to the user input commands may provide a maximal amount of torque available to the wheels. However, due to this inherent stiffness in the wheel gains, sudden changes in the wheel acceleration (i.e., a fast start or a fast stop) may cause the center of gravity to pitch forward or backward. This may result in the cluster lifting a pair of wheels off of the ground as it tries to apply a correcting torque to the system by rotating the cluster. When such a torque is applied, the wheels PD is probably not appropriate. Thus, the device may switch to a second mode, wheels POC mode.

The objective of wheels POC is to stabilize the transporter such that all four wheels are on the ground and the center of gravity is located above the cluster between the two endpoints of the cluster. In this mode, both the wheels and the clusters are used in an attempt to place the center of gravity at a reference position inside the footprint. In this mode, the wheels use pitch information in order to translate the center of gravity to a position over the footprint.

Commanding the wheels in a way that centers the center of gravity over the cluster joint, may at times be inconsistent with the commands given by the user. To accommodate this, the gains or architecture utilized by the control unit in the wheels POC sub-mode give pitch and rate signals greater influence while the user commands are given a lower influence. In general, the wheels POC sub-mode may only come into play when the stability of the transport device is becoming questionable. For example, questionable stability may occur when driving over large obstacles or over very bumpy surfaces.

As one of skill in the art will readily realize, rotation of a cluster alone may only be effective to stabilize the transport device when the center of gravity is substantially centered between the endpoints of the cluster. Once the pitch error (i.e., the amount by which the center of gravity is displaced from a position substantially in the center of the cluster) is large enough to put the center of gravity over one set of wheels, the cluster is less effective and the wheels may need to be used as the primary means of stabilization. Thus, enhanced mode also includes a third sub-mode, referred to as wheels balance sub-mode. The objective of the wheels balance sub-mode is two-fold, to stabilize the transporter in the event of large pitch disturbances and to return the center of gravity and cluster to an orientation where either the wheels PD or the wheels POC sub-modes are effective. As discussed above, wheels PD and wheels POC may be more effective when the cluster is near horizontal. Wheels balance may be similar to balance mode in wheel operation but also includes the ability to rotate the cluster.

Each of the above identified modes may be implemented in a single control loop contained in the control unit. Depending upon which sub-mode of enhanced mode the transport device is currently operating in, various gain coefficients are applied to the control loop in order to achieve the above-identified effects. The gains for each sub-mode may vary, for instance, the amount by which the user may control the transport device and the amount by which the transport device dynamically stabilizes itself. In addition, each sub-mode may be implemented as a separate control architecture.

As mentioned above, the control unit of the transport device may implement various gains or control architectures in a control loop in order to control and stabilize the transport device in enhanced mode. In order to know when to switch between the sub-modes of enhanced mode (and therefore, when to switch the gains or control architecture in appropriate embodiments) some basic switching criteria should be established. In some embodiments, the quantity $q_0$ discussed above may be used as a measure to decide when to switch between modes. For example, $q_0$ may be used to switch between wheels PD and wheels POC. In addition, the value $\phi_c$ (cluster position with respect to gravity) may also be used to switch from either wheels PD or wheels POC into wheels balance mode. (Of course, other parameters may be used in addition or instead in other embodiments).

Switching between various modes in enhanced mode may be dependent upon the cluster position with respect to gravity, $\phi_c$. FIG. 9 shows a graphical representation 900 of different values of $\phi_c$. Again, $\phi_c$ represents the cluster position with respect to gravity and is measured such that a vertical cluster position results in a $\phi_c$ which is equal to zero and a horizontal cluster-position which results in a $\phi_c$ equal to 90°. In the graphical representation of FIG. 9, the vertical axis 902 represents $\phi_c$ being equal to zero degrees and the horizontal axis 904 represents $\phi_c$ being equal to 90°. In this embodiment, the transport device may remain in either wheels POC or wheels PD when the angle $\phi_c$ is near 90°.

As shown in FIG. 9, the region in which the transport device remains in either wheels POC or wheels PD is the region 906 which lies between the horizontal axis 904 and the ray 908. If the cluster angle with respect to gravity $\phi_c$ remains below the ray 908, the transport device may remain in either wheels POC or wheels PD. If $\phi_c$ increases above a value represented by ray 910, the transport device transitions to and remains in wheels balance mode. That is, while $\phi_c$ remains in the region 912 between the vertical axis 902 and the ray 910, the transport device will remain in wheels balance. However, there exists a region 914 between rays 910 and 908 where the appropriate operating mode for this embodiment is more difficult to select. In this region 914 various other factors may be taken into account to determine whether the transport device should be in wheels balance mode or in one of the other modes. If the center of gravity, as may be determined by frame angle and pitch rate, is approaching or is over the footprint of the device, the transport device should transfer into either wheels PD or wheels POC. If the center of gravity is substantially over either of the ground contacting member, however, the transport device should transfer to wheels balance mode. Example angular values for the location of rays 910 and 908, respectively may be 30° and 60°.

According to one embodiment, the transition from wheels PD to wheels POC and back may be determined based on a control switch value σ. σ may be defined in relation to $q_o$ such that $$\sigma = |\phi_c'| + A_1 |LPF(q_0)|$$

where $A_1$ is a scaling constant and $LPF(q_0)$ is the output of a first order lowpass filter provided with an input signal of $q_0$. $\phi'_c$ may provide a rough indication of the smoothness of the surface being traversed. For example, the magnitude of $\phi'_c$ will be large on uneven surfaces due to rapid cluster orientation changes. Likewise, the magnitude of $\phi'_c$ will be smaller on smooth surfaces. It has been empirically determined that a value of $A_1$ equal to 1.66 is an effective value for some embodiments.

In order to prevent chattering between modes a hysteresis type of determination may be made when switching modes. For instance, if σ is greater than or equal to an entry value (e.g., 1), the transport device enters wheels POC. The transport device will stay in wheels POC until the value of σ falls to or below an exit value (e.g., 0.5) which point the transport device transfers to wheels PD. Of course, the entry and exit values may vary depending upon the operational characteristic of the transport device.

FIG. 10 shows a dataflow diagram of one embodiment by which the value of σ may be determined. The external inputs are the pitch rate ($\theta_1'$) contained in data block 1002, the frame pitch $\theta_1$ contained in data block 1004, and the cluster velocity with respect to gravity $\phi_c'$ contained in data block 1006. The frame pitch $\theta_1$ is multiplied by the natural frequency of an inverted pendulum $\omega_n$ at block 1006. The output of block 1006 is added to the pitch rate received from data block 1002 at summation block 1008. The output of the summation block 1008 is $q_0$. The value $q_0$ is then passed through a low-pass filter at block 1010. The absolute value of the low-pass filtered $q_0$ signal is then determined by block 1012. The output of block 1012 is then added at the summer 1016 to the cluster velocity $\phi_c'$ of data block 1006 after it has been passed through a low-pass filter at block 1014 and the absolute value has been determined (block 1020). The output of the summer 1016 is then passed through low-pass filter 1018 and the output of the low-pass filter 1018 is the value of σ in accordance with the equation described above.

FIG. 11 shows one embodiment of a flow chart of a method of determining when to transfer between sub-modes of enhanced mode based (in this embodiment) upon $\phi_c$ and σ. Of course, different switching criteria could be used depending upon how the transport device is modeled. The process begins at block 1102 where the current values of $\phi_c$ and σ are received. At block 1104 it is determined whether $\phi_c$ is less than $WB_{on}$. The variable $WB_{on}$ represents the angular value for $\phi_c$ below which the transport device should always remain in wheels balance mode. This is shown in FIG. 9 as the region 912 between ray 910 and the vertical axis 902.

If $\phi_c$ is less than $WB_{on}$, at block 1106 it is determined whether the transport device is currently in wheels balance mode. If the transport device is currently in wheels balance mode than no further processing is required and the process returns to block 1102. However, if the transport device is not in wheels balance mode then, at block 1108, the transport device is transferred to wheels balance mode and processing returns to block 1102.

If $\phi_c$ is not less than $WB_{on}$, it is then determined at block 1110 whether or not $\phi_c$ is greater than $WB_{off}$. The value of $WB_{off}$ is the value of $\theta_c$ below which the transport device should be in either wheels POC mode or wheels PD mode. $WB_{off}$ is represented in FIG. 9 as ray 908. If $\phi_c$ is greater than $WB_{off}$, processing transfers to the wheels PD/wheels POC hysteresis processing section 1112. If $\phi_c$ is not greater than $WB_{off}$, it is known that the value of $\phi_c$ is in the region between the rays 910 and 908 of FIG. 9 (e.g., region 914). As discussed above, in this region, if the center of gravity is near an axis of one of the wheels of the cluster, then the transport device should transfer to wheels balance mode. Thus, at block 1114, it is determined whether the center of gravity is near one of the wheel axis. If the center of gravity is near one of the wheel axes, then at block 1116 the transport device is transferred to wheels balance mode and processing returns to block 1102. If, however, the center of gravity is not near one of the wheel axes, processing enters the wheels PD/wheels POC hysteresis processing block 1112. The location of the center of gravity, as discussed above, is a convenient quantity to consider when determining when to switch modes. However, it should be noted that the center of gravity may actually only be an estimated location that is based upon operational characteristics of the transport device. For instance, the center of gravity may be a representation of both the frame pitch and/or the pitch rate of the transport device. These quantities (as well as others) may be derived from position, velocity, and acceleration sensors that may be included in the transport device.

The hysteresis processing block 1112 performs the functions described above with respect to transferring between wheels POC and wheels PD based upon the value of σ. Within block 1112, it is first determined at block 1118 whether the transport device is currently in wheels POC mode. If the transport device is in wheels POC mode, then at block 1120 it is determined whether σ is greater than 0.5. Because it has already been determined that the transport device is already in wheels POC, the value of σ must fall below 0.5 in order to transfer to wheels PD mode. Thus, if it is determined at block 1120 that σ is greater than 0.5, the transport device should stay in wheels POC mode and processing returns to block 1102. However, if σ has fallen below 0.5, the transport device is transferred to wheels PD mode at block 1122 and processing then returns to block 1102.

It was determined at block 1118 that the transport device was currently not in wheels POC, then, if it is determined at block 1124 that σ has not risen above 1, the transport device should remain in wheels PD mode and processing returns to block 1102. However, if σ has risen above 1, then the transport device is transferred to wheels POC mode at block 1126 and processing returns to block 1102. It should be noted that the values for switching given above are by way of example only. These values may change depending upon, for instance, the weight of the user, the weight of the transport device, the accuracy of various sensors of the transport device, and the like.

The various switching processes described above, as well as various stabilization control within each mode, may be effected by driving both the wheels and the clusters of the transport device. Each wheel may be independently driven by a separate motor. Alternatively, some of the wheels may not be driven by a motor or two wheel attached to a common axis may be driven by a single motor. In addition, the cluster may include a separate motor.

Regardless of how the transport device is configured, the commands that will control the wheels and cluster, expressed as voltages $V_w$ and $V_c$, respectively, such that the transport device remains stable in any of the modes of enhanced mode:

$$V_w = K_1\theta_1 + K_2\theta_1' + K_3X + K_4X'; \text{ and}$$

$$V_c = K_5\theta_1 + K_6\theta_1' + K_7\phi_c + K_8\phi_c'$$

The voltages represent a voltage applied to a drive of an electric motor to produce an output torque. Of course, the drive need not be electric and, in any case, some value other than voltage may be used. The variable X represents the horizontal position error of the transport device and is the difference between the horizontal position of the transport and the desired horizontal position of the transport device. The ' (prime) notation indicates time differentiation. The coefficients $K_1$-$K_8$ vary depending upon which sub-mode of enhanced mode the transport device is operating.

Examples of relative values of gain coefficients $K_1$-$K_8$ that may be used by the control unit for each mode are set out in Table A below. Depending on which gains are utilized, the control unit will control the transport device in various ways corresponding to the applicable sub-mode.

TABLE A

|  | Gain | | | | | | | |
| --- | --- | --- | --- | --- | --- | --- | --- | --- |
|  | K1 | K2 | K3 | K4 | K5 | K6 | K7 | K8 |
| Variable | $0_1$ | $0_1'$ | x | x' | $0_1$ | $0_1'$ | _c | _c' |
| PD | 0 | 0 | ++ | ++ | + | + | 0 | + |
| POC | + | + | 0 | + | + | + | 0 | + |
| WB | + | + | − | − | + | + | + | + |

The relative strength and sign of each gain value listed in Table A is sufficient to distinguish each sub-mode. In Table A, a value of ++ is greater than a value of +. The zero values are not necessarily exactly equal to zero but rather, may represent a very small value.

Figure 12A:
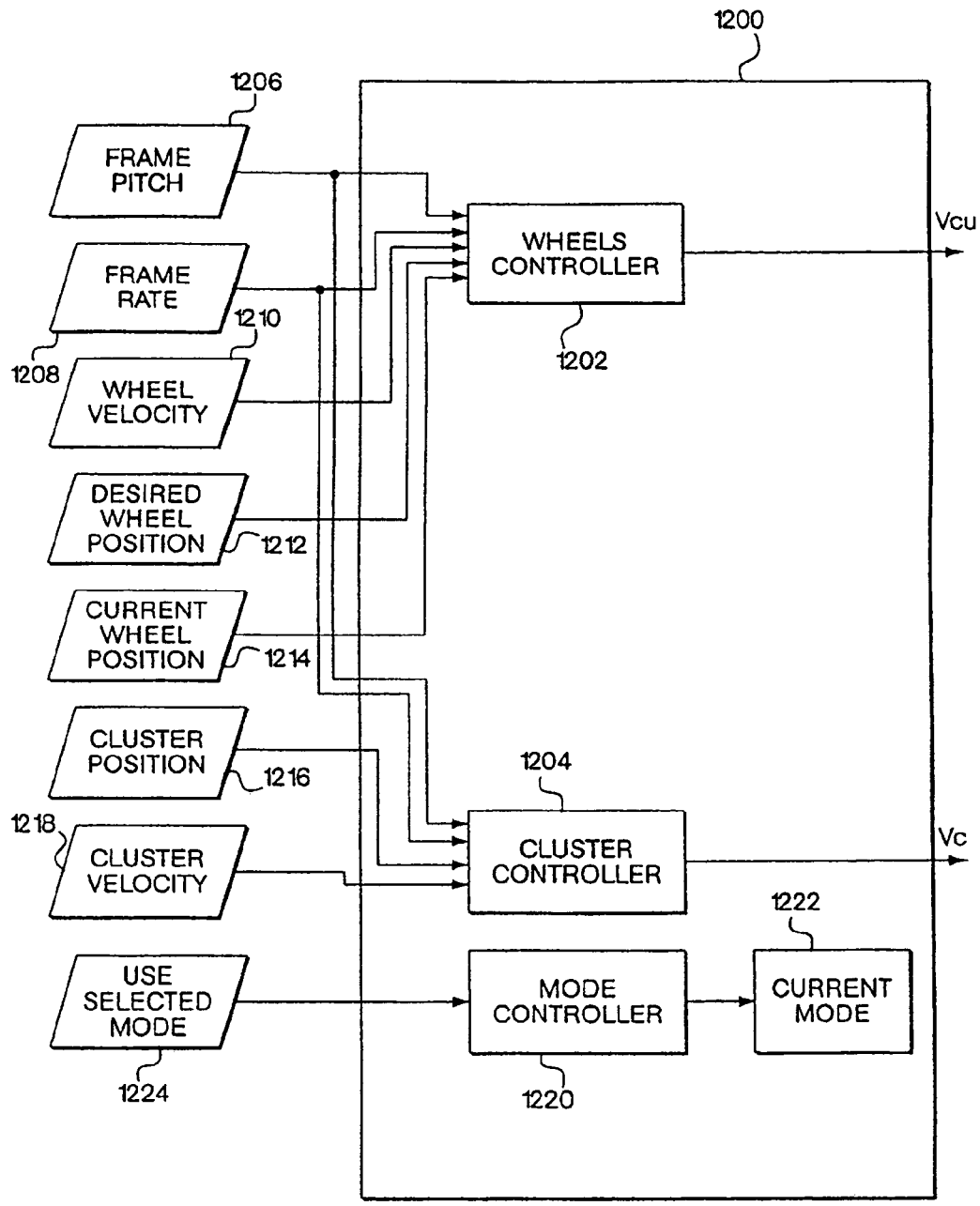
FIG. 12A illustrates an example of a control unit which may be utilized in conjunction with the present invention.

FIG. 12A shows a block diagram of a control unit 1200 which may be utilized in conjunction with the present invention. The control unit 1200 of this embodiment may control both the cluster and the wheels attached to the cluster according to the equations for $V_c$ and $V_w$ described above. The primary role of the cluster is to apply torque based on the frame dynamics with respect to gravity (i.e., the cluster is rotated to keep the platform at a desired pitch angle with respect to gravity). In enhanced mode, the wheels should follow the command from the user while monitoring two criteria. If the clusters position with respect to gravity is changing (i.e., the ground incline is changing), or the magnitude $q_o$ is large, the wheels may switch from the control of the user to helping the cluster keep the frame upright by using a balancing control instead of a position/velocity control. If the angle of the cluster with respect to gravity diminishes (i.e., the cluster is approaching vertical), the objective is to force the cluster to drop to a more horizontal orientation while minimizing the distance traveled. This helps to ensure that the user remains comfortably supported on the transport device.

The control unit 1200 may include a wheels controller 1202 and a cluster controller 1204. The wheels controller 1200 may receive various inputs related to the current operational characteristics of the transport device as well as directional user inputs (for example, received from a joystick). From the inputs, the wheels controller 1202 may generate wheel control voltage $V_w$ which controls the wheel motors. The value of $V_w$ causes the wheel motors to apply a torque to various wheels of the transports device in order to allow the transport device to be "driven" across a surface. As discussed above, the transport device may include a motor for each wheel and a separate value $V_w$ may be generated for the motor of each wheel. In this manner, steering of the transport device may be accomplished by applying differential wheel voltages to the wheels.

The cluster controller 1204 may also receive various positional inputs related to the transport device in general as well as cluster specific information. The cluster controller 1204 converts this information into a cluster motor control voltage $V_c$. The cluster motor receives the signal $V_c$ and causes the cluster to rotate about an axis.

In one embodiment, the wheel controller 1202 may receive an input from data representing the pitch of the frame ($\theta_1$) from data block 1206. It should be noted that the data as described herein has been recited positively as a value. For instance, frame pitch has been represented as an angular value. However, any of the values used to control both the directional control and stability of the transport device may be expressed as an error term that represents how far the given parameter is from a desired location or in a number of other ways. For instance, the pitch of the frame may be represented as a value by which the current frame pitch differs from a desired pitch. That is, the error signal may equal the difference between the current frame pitch and a frame pitch that places the center of gravity directly over the center point of the cluster. In addition, while various angles have been designated in degrees herein, each angle may be expressed in radians or in "counts" (whole number values) that are calibrated such that the transport device has the desired response upon the receipt of such a value.

The wheel controller 1202 may also receive a frame rate indication from the data block 1208. The frame rate indicates the rotational rate at which the frame is moving and may be expressed as the time derivative of the frame pitch of data block 1208. In addition, the rate at which the frame is moving may be dependent upon the height of the platform relative to the cluster. As the seat is raised, the gains (discussed below) applied to the frame rate input may be modified to cause a more desirable response to frame rate information to keep the transport device, and ultimately the user, from tipping over.

The wheels controller 1202 may also receive, from data block 1210, the current velocity with which each of the wheels is rotating. This velocity may be expressed, for example, in incremental units or may he based upon the rate of rotation and represented as $\omega_{wheels}$.

The wheels controller 1202 may also receive several inputs from a user input such as a joystick. Typically, these inputs are expressed as a desired wheel velocities contained in data block 1212. The desired wheel position could include, but is not limited to, the desired direction of travel and the velocity of travel. The wheels controller 1202 may also receive an indication of the current wheel position from data block 1214.

The desired wheel position as embodied at block 1212 may be compared with the current wheel position by the wheels controller 1202 to determine the differential velocity and direction with which the wheels should be driven in order to respond to user input commands. The directional differential information may cause different motors attached to different wheels to receive different wheel voltages $V_w$ in order to turn the transport device.

The cluster controller 1204 may also receive the frame pitch from block 1206 and the frame rate from block 1208 that was received by the wheels controller 1202. The cluster controller 1204 may also receive a cluster position from data block 1216. This cluster position was described as $\phi_c$ above. Again, the cluster controller 1204 may attempt to rotate the cluster such that the center of gravity is kept over the footprint of the transport device.

The cluster controller 1204 may also receive a cluster velocity from data block 1218. The cluster velocity may be expressed as the rate at which the cluster is rotating about a rotational axis passing horizontally through the cluster. This cluster rate may be the derivative with respect to time of the cluster position received from data block 1218. Both the position and the velocity may be determined by appropriate sensors included in the transport device. Appropriate sensors may include, but are not limited to, accelerometers, velocity sensors, and position reporting sensors.

In addition, the control unit may include a mode controller 1220. The mode controller 1220 may control transitions from various modes to other modes. The mode controller 1220 may be a separate controller or may integrated into either or both of the wheels controller 1202 and the cluster controller 1204.

The mode controller 1220 may output a current mode 1222. The current mode may be based upon a user selected mode received from data block 1224. The current mode may also specify a specific sub-mode of enhanced mode that the mode controller has determined the transport device should be in based upon any or all of the inputs received by the wheels controller 1202 and the cluster controller 1204. In addition, the current mode may be used by the control unit 1200 in order to determine the correct gains to be applied to control loops which may reside within the wheels and/or cluster controllers, 1202 and 1204, respectively, or which control architecture should be selected.

In one embodiment, the computed voltages $V_w$ and $V_c$ are used to drive an electric motor. However, other types of actuators may be used such as hydraulic actuators, combustion engines, and the like. In such embodiments, control signals other than voltages may he computed and applied to the actuators in accordance with the above equations or similar equations that may take into account various operational parameters of the actuator.

In an embodiment in which $V_w$ and $V_c$ are used to drive an electric motor, the voltages may be divided by the battery voltage to generate a duty cycle command to an amplifier attached to each of the wheels motors and the cluster motor.

Figure 12B:
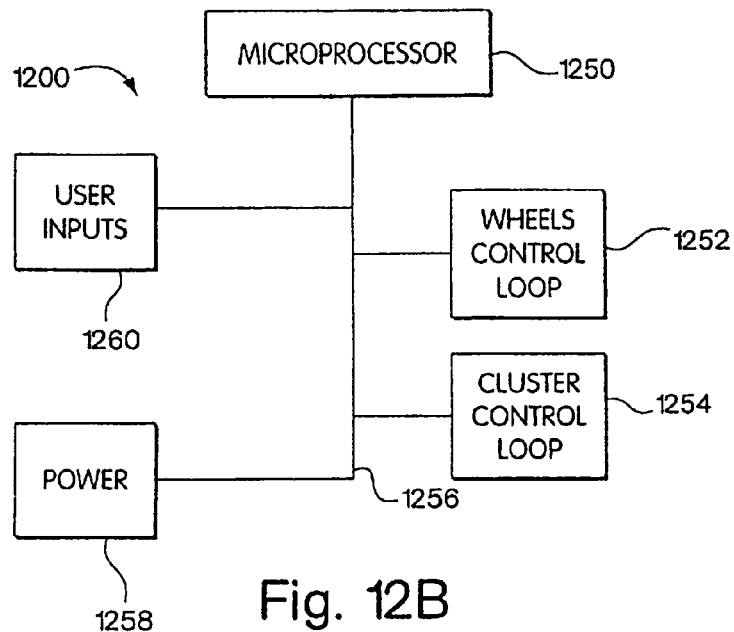
FIG. 12B illustrates a functional block diagram of one embodiment of the control unit of FIG. 12A.

FIG. 12B is a functional block diagram of a control unit 1200. The control unit 1200 may include a microprocessor 1250. The microprocessor 1200 may be linked to, and in communication with, a wheels control loop 1252 and a cluster control loop 1254 via bus 1256. The microprocessor may receive various sensor inputs from the wheels control loop 1252 and the cluster control loop 1254 and determine, from these inputs, any of the quantities described above with respect to FIGS. 7A and 7B. For instance, the microprocessor may determine the pitch rate of the transport device based upon data received from a velocity sensor in either or both of the wheels and cluster control loops 1252 and 1254, respectively. These determinations may be made, for example, by software or hardware contained in the microprocessor 1250. In addition the microprocessor 1250 may perform calculations that determine the location of the center of gravity, as well as the resultant desired orientations based thereon, described below.

The microprocessor 1250 may receive power from a power source 1258 (e.g., a battery). In some embodiments, the microprocessor 1250 may determine the amount of power that the wheels and cluster control loops, 1252 and 1254, respectively, may receive depending upon, for example, the current operational mode of the transport device. In addition, user inputs may be received from a user input block 1260. These user inputs, as discussed below, may be given vary amounts of consideration by the control unit 1200 depending upon the particular mode of operation the transport device is in.

Figure 13:
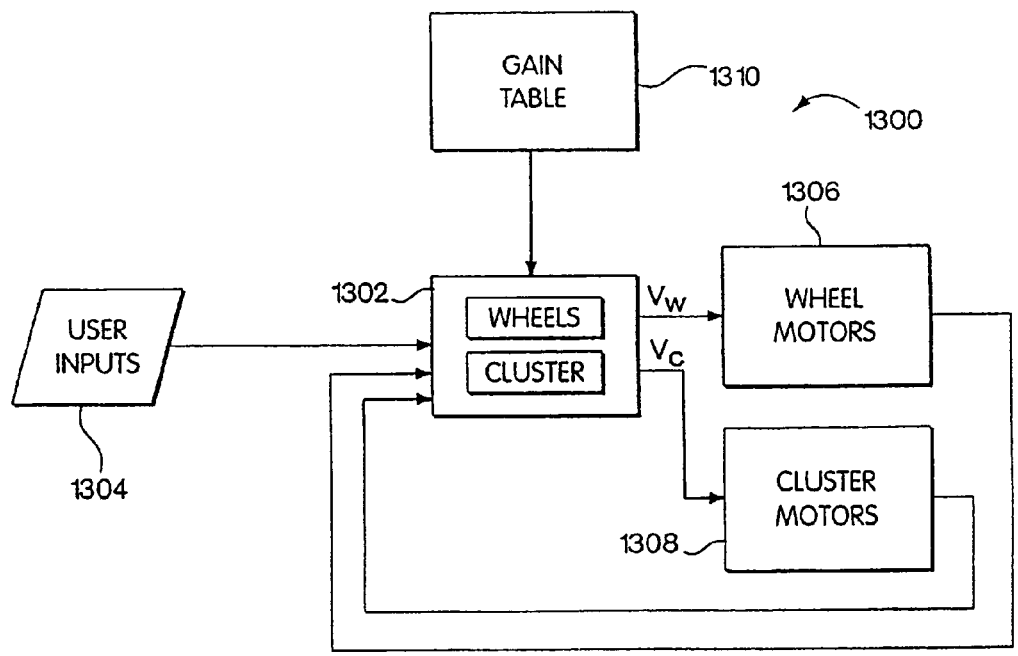
FIG. 13 illustrates a control loop which may be implemented according to the present invention.

FIG. 13 is a control loop 1300 which includes a control unit 1302. The control unit 1302 may be similar to the control unit 1200 of FIGS. 12A and 12B. In this embodiment, the control unit 1302 receives various inputs, and outputs the wheel and cluster control voltages, $V_w$ and $V_c$, respectively.

The control unit 1302 may receive user inputs from user input data block 1304. As is described above, these user inputs may be provided by sensing the deflection of a joystick which serves as a user input device. In addition, the user input may represent the user leaning on a lean platform as described above. The control unit 1302 may also receive feedback information from the wheel motors 1306 and the cluster motor(s) 1308. Based on the mode of operation, and the values of the user input and the information received from the wheel motors 1306 and cluster motors 1308, the control unit 1302 may determine the values $V_w$ and $V_c$ which in turn cause the wheel motors and the cluster motors, respectively, to cause a change in the relative positions of the wheels and cluster.

In some modes, it is desirable to have the user inputs given priority over the control of the wheel motors current. An example of such a mode is standard mode described above. In such a mode, the control unit 1302 provides high sensitivity, as selected from the gain table or specific control architecture 1310, to the user input commands. In this manner, the user may have great control of the transport device. However, in such a mode, the stability of the transport device may be reduced. In other modes, it may be desirable to increase the stability of the transport device. In such a mode, the user inputs are given lower sensitivity and stabilization routines are given higher sensitivity. In this manner, the transport device may become more stable based upon the control parameters which may be embodied in either software or hardware within the control unit 1310.

FIG. 14 is an example of the gain table 1400 which may be used according to aspects of the present invention. The gain table 1400 may be for a device having three modes, mode 1 1402, mode 2 1404, and mode 3 1406. Each mode, in this embodiment may include three gain coefficients $C_1$, $C_2$, and $C_3$. It should be noted that the gain table 1400 of FIG. 14 is given by way of example only and does not reflect preferred gain values. That is, the values and the modes shown in FIG. 14 do not necessarily reflect preferred coefficients for each of the various modes described herein.

The coefficients are used by a control unit to, in some embodiments, increase or decrease the effects of certain inputs. For instance, the coefficient $C_1$ may be multiplied by a position error term of a transport device to vary the effect the position error term has on the operation of the transport device.

In the example of FIG. 14, the coefficient $C_1$ may correspond to a coefficient which is applied to the cluster position as determined by a value received from the cluster motor. The value $C_2$ may correspond to a coefficient which is applied to the value of the position of the wheels received from the wheel motors. The value $C_3$ may be a coefficient applied to the direction vector received from a user input. In the gain table 1400, the higher the value assigned to a particular coefficient the more precedent in the control system the input to which the gain is applied may receive. For example, in mode 1, the cluster coefficient $C_1$ is given a value of 1. Having a low value such as 1 may mean that in mode 1 the cluster position is not used very much in order to stabilize the transport device. The coefficient $C_2$ for mode 1 is given a value of 3. Thus, the wheels are a more active part in the stabilization of the transport device than was the cluster. Similarly for $C_3$ of mode 1, a value of 7 is shown. This high value of $C_3$ means that mode 1 is very responsive to the user input. Thus, mode 1 could be a mode that has little stabilization, and what stabilization there is may come from rotation of the wheels while the response to the user input is matched very closely. Mode 1 could therefore be a mode that is similar to standard mode described above.

In the same manner, mode 2 hits zero cluster gain, a relatively small wheel gain ($C_2=5$) and $C_3$ is a relatively high value ($C_3=6$) so that user inputs are followed closely. This mode may also be similar to a balance mode where the wheels are primarily responsible for the balancing of the transport device and the cluster remains in a fixed position. The response of user input $C_3$ is lower than standard mode (i.e., for example mode 1) in order allow the wheels to stabilize a transport device without significant interference from the user input. However, the user input is not set to zero because it may be desirable in a balancing mode to allow the user to traverse across a surface while the wheels are balancing and maintaining the transport device in a substantially upright position.

Mode 3 has the cluster and wheel gains set to levels such that cluster position and wheel position are related to and may be used to automatically control of the stability of the transport device. The user input gain $C_3$ is reduced to a very small level so that the user still has some control of the transport device but the stabilization is primarily conducted automatically by the clusters and the wheels. Such a mode could be, for instance, an enhanced mode when it has been determined that the transport device is relatively unstable. In such a mode, the clusters and the wheels are rotated such that the center of gravity of the transport device is maintained between the end points of the cluster.

Control Scheduling

As discussed above, the enhanced mode controller may switch between various modes. One of the reasons for switching between modes is to attempt to stabilize the human transport device. When transferring between sub-modes, the gains supplied to the control loops in the control unit may be changed or the control architecture itself may be changed. However, abruptly changing the gains or architecture may abruptly affect the operation or the transport device. This in turn may cause rapid acceleration of the center of gravity which will cause the transport device to become uncomfortable or even unstable. In addition, abrupt control changes (either gains or architectures) may increase wear on the system. Thus, there needs to be some method of smoothly transferring modes. The systems and methods described herein for smoothly transferring between modes of a system are effective in the context of controlling a human transport device.

One of ordinary skill will realize that the teachings related to smooth modal transitions is not limited to application to human transport devices and may be applied to any multi-mode systems that transfers between modes. Thus, the following description will refer a "system" instead of a human transport device. In some embodiments, the system may be a system that includes feedback from a controlled device, however, feedback is not necessary to control the scheduling discussed herein.

One approach utilized in the past to smoothly transition from one mode to another in other contexts was to slew the gains from the original mode until the gains equal the gains of the new mode. Suppose for example, the gain $K_1$ was a value of 4 in a first mode of operation. The gain factor $K_1$ for the second mode may be, for example, 10. To directly apply this new gain value may cause a sudden disturbance to the system as it changed modes. A sudden disturbance may effect the operation of the system and cause the system to become unstable. Thus, in the prior art, the gain value was slowly slewed from 4 to 10 by repetitively increasing the value of the gain factor (e.g., $K_1$). For instance, at a time $T_0$ the gain factor may be a 4, at a time $T_1$ the gain factor may be 5, it a time $T_2$ the gain factor may be a 6, and so on until the gain factor reaches the final value of 10.

However, it has been discovered that operating in this manner may require too much time for the gain value to reach the correct state in order to stabilize the operation of the system while still responding in a manner commiserate with the desired new mode. In addition, the system may switch modes again before the gain has been slewed to the new value. In such a case, the system never truly reaches the new mode of operation and remains in a quasi-mode, between modes that may be unpredictable. Unpredictability may lead to system errors that diminish the effectiveness of the system.

In addition, it may be desirable to smooth the control commands of the system even when the system has not experienced a mode change. For example, a large voltage discontinuity in a control signal received from a motor controller may cause damage to the motor drive system.

Thus, in one embodiment, the control command from a control unit is smoothed before being applied to the controlled device. The smoothing may be done by, for instance, by a smoothing device disposed between the output of a control unit and a device being controlled by the control unit. The smoothing device may be, for example, any type of filter that limits the rate at which the control signal may change or a summer that adds an offset value to the control signal.

FIG. 15 is an example of a system that may be implemented to smooth a control signal before it is applied to a controlled device 1502. The system may include a control unit 1504 which produces a control signal. The control signal is used to control the operation of the controlled device. The control signal may experience rapid value changes for a number of reasons. An example of a rapid change in the control signal could be due to a change in the mode of operation of the system. The smoother 1506 may limit the rate at which the control signal that is ultimately applied to the controlled device 1502 (i.e., the output of the smoother 1506) may vary.

The smoother 1506 maybe, for example, but is not limited to, a filter, a summer which adds an offset value (possibly a decaying offset value) to the control signal, a hysteresis control circuit, and the like.

FIG. 16 is a block diagram of a method of smoothing a control signal. The process begins at block 1600 where the value of the control signal is determined. The control signal may be generated by a user input, a control loop output, a preset value, and the like. The value of the control signal may in any type of units such as a voltage, a current, a digital representation of a value, an analog signal, and the like.

After the control signal has been determined, transition processing is conducted at block 1602. The transition processing may include, but is not limited to, smoothing the control signal, adding an offset to the control signal, determining the rate of change of the control signal, and determining whether the system has transferred between modes. In some cases, transition processing may include doing nothing to the control signal.

After the control signal has been processed and any necessary modifications have been made to the control signal at block 1602, the modified control signal is applied to the controlled device system. The system could include a single controlled device or several controlled devices.

In one embodiment, the present invention may include systems and methods that transfer between modes such that the transition is smooth and such that the transition between modes is almost instantaneous. In one embodiment, this may be accomplished by instantly installing the new set of gain coefficients into the system while allowing the difference between the last control signal applied to the controlled device (i.e., the modified control signal) when using the first coefficients and the un-modified control signal generated using the new coefficients to decay gradually over time. In another embodiment, the system may change control architectures when the mode changes and allowing the difference in control signals to decay. How the offset (difference) may be decayed and added to the control signal is described in greater detail below.

Figure 17A:
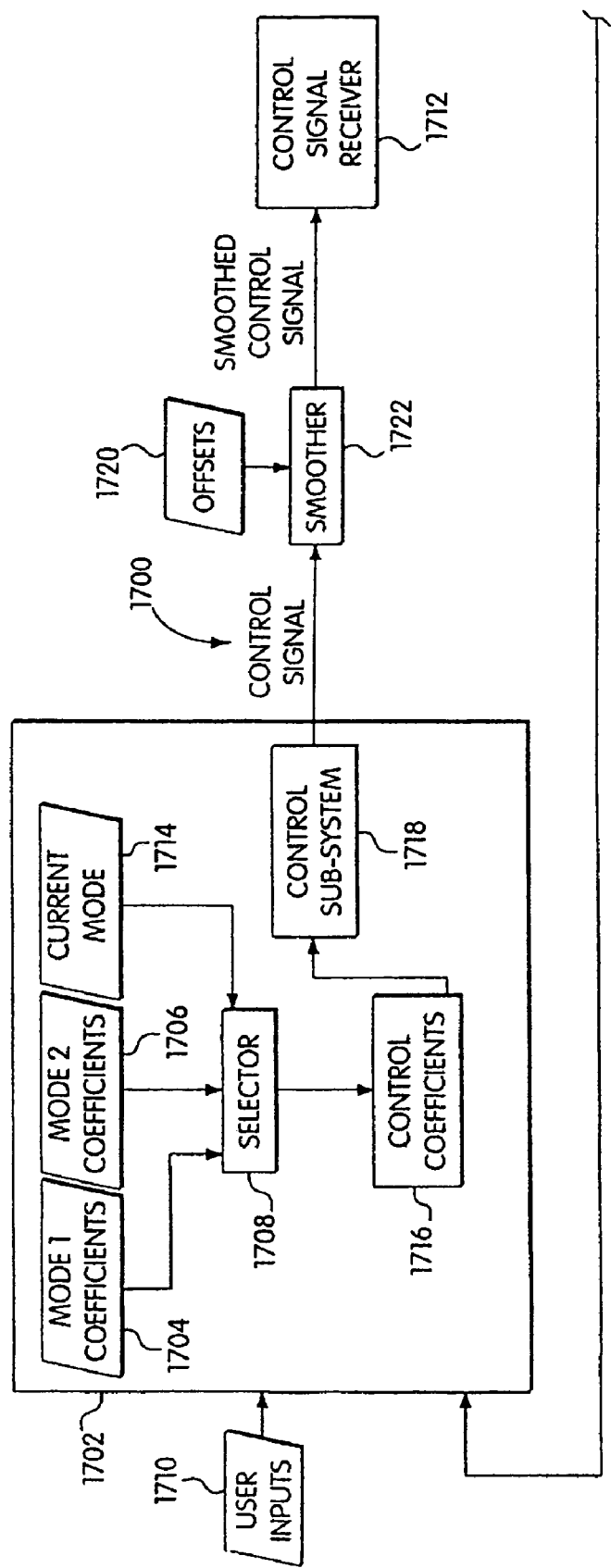
FIG. 17A illustrates a block diagram of a control loop configured to perform gain scheduling operations according to aspects of the present invention.

FIG. 17A shows a block diagram of a control loop 1700 configured to perform gain scheduling operations in order to smoothly transfer between modes. The control loop 1700 includes a control unit 1702 which is part of a feedback loop. The control unit 1702 may receive user input from data block 1710. However, the control unit need not receive user inputs and could be entirely self-regulating. The control unit may also receive current operational characteristics from the control signal receiver 1712. The control signal receiver 1712 may be any device which responds to an input signal. For instance, the control signal receiver 1712 may be an electric motor that rotates dependent upon the level of all input control voltage. In this case, the control signal would be a control voltage.

The control unit 1700 may include gain coefficients 1704 for a first operational mode and gain coefficients 1706 for a second operational mode. These coefficients may be stored in a single gain table or may exist in their own individual tables. The coefficients may be stored in any computer readable medium such as floppy disk, ROM, RAM, and the like.

Based upon the current mode of operation, as represented in current mode data block 1714, a selector 1708 may choose whether to apply the coefficients for the first mode 1704 or the coefficients for the second mode 1706. The selector 1708 selects the correct coefficients and applies them as the control coefficients 1716 for the control unit 1702. The control coefficients may, for example, represent the current mode gain coefficient to be applied to the operation of a human transport device.

More particularly, the control coefficients may be applied to various input values received from a user or from the control signal receiver 1712. The control coefficients may be used by a control subsystem 1718 of the control unit 1702. The control subsystem 1718 may include various control loops which apply the control coefficients 1716 to the various inputs to produce a control signal. For instance, the control subsystem 1718 could include the cluster and wheel controllers described above.

The system also may receive an offset value from offset data block 1720. The value of the offset may be the difference between the value of the last control command that was applied to the control signal receiver 1712 (i.e., the last smoothed control signal) immediately before the system switched modes and a control signal that is produced immediately after the control coefficients have been changed. The offset value is received by a smoother 1722 that repeatedly adds the current control signal to a decaying version of the value received from the offset data block 1720. For example, if the smoothed control signal has a value of 100 immediately before the system transfers modes and a control signal value of 10 immediately after the system has transferred modes, a value of 90 is added to the control signal on the first pass through the control loop 1700 after the system has transferred modes. This value is then decayed by a certain amount and again added to the control signal on the next pass through the control loop 1700. This may be repeated until the offset value has been decayed so that it is relatively close to zero. It should be noted that the offset value may be either a positive or negative number depending upon the values of smoothed control signal applied during the first mode and the new control signal produced at the beginning of the second mode.

Figure 17B:
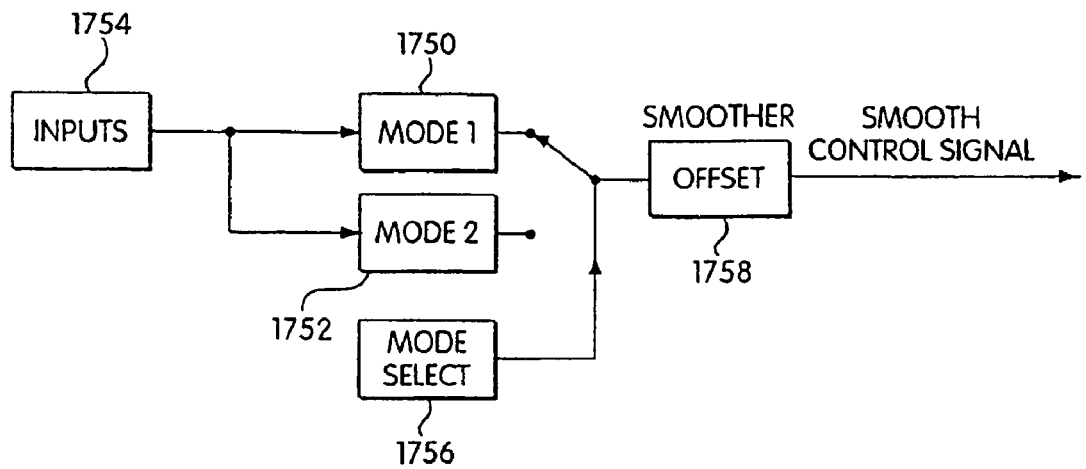
FIG. 17B shows an embodiment of a control system that may smoothly transition between modes.

FIG. 17B shows a block diagram of another control system that may smoothly transition between modes. In this embodiment, a first mode has first control architecture 1750 and a second mode has a second control architecture 1752. Each control architecture may create different control signals that will control the system in different manners. The inputs (1754) from the control signal receiver (not shown) are applied to both control architectures. Switch 1756, based on the current mode, selects either the first or second architecture that will control the system. In a manner similar to that described above, the smoother 1758, adds a decaying offset in order to provide a smooth control signal to the control signal receiver (not shown).

As described above, the controller scheduling techniques allow for the smooth transition between control modes. The above description was given with various references to the operation of a transport device. However, as one will readily realize the teachings with respect to control scheduling may be applicable to any control system. For example, this type of controller scheduling may be used when controlling the transitions of modes in an airplane, a helicopter, an electric motor, a hydraulic motor, a combustion engine, or a jet engine.

Figure 18:
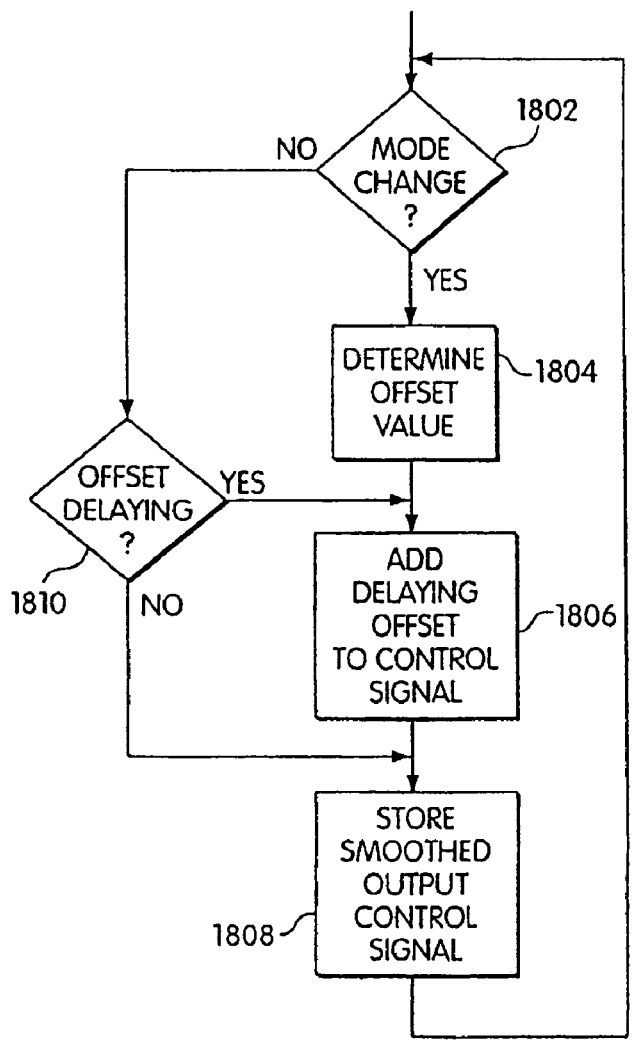
FIG. 18 illustrates a flow chart of a control scheduling process that may be implemented in a feedback control system according to aspects of the present invention.

FIG. 18 is a flow chart of a control scheduling process that may be implemented in a feedback system for controlling a system. The process begins at decision block 1802 where it is determined whether the mode of the system has changed since the last pass through the process. If the mode has changed, then an offset value is determined at block 1804. As discussed above, the offset value may be equal to the value of the last control signal passed to the control signal receiver (FIG. 17) minus the first control signal produced after switching modes. However, the process does not necessarily have to use the first control signal produced in the new mode and may use a control signal produced at some time near the mode transfer. After having determined the offset value, a decaying offset value is added to the control signal at block 1806. Various methods of producing a decaying offset are discussed below.

At block 1808, the value of the smoothed output control signal is stored for later use. Processing is then returned to block 1802.

If at block 1802 it is determined that a mode has not changed, it is then determined at decision block 1810 whether there is currently an offset decaying. If an offset is decaying, it is preferable to add the decaying offset to the control signal at block 1906. If, however, an offset is not decaying, processing continues at block 1808. As one would readily realize, it may not be necessary to determine whether or not an offset is decaying. In that case, the decision block 1810 may be omitted and if it is determined at block 1802 that a mode has not changed, processing passes directly to block 1806.

There may exist several different ways in which an offset value may be decayed. For instance, the value of the offset may be multiplied by a factor which makes it decay (e.g., a value less than one). This produces a new offset value which is less than the previous offset value. This lower offset value is updated to become the current offset value and passed to the smoother to be added to the next control signal. Alternatively, the offset could be decayed by repetitively subtracting a fixed value from the offset.

Figure 19:
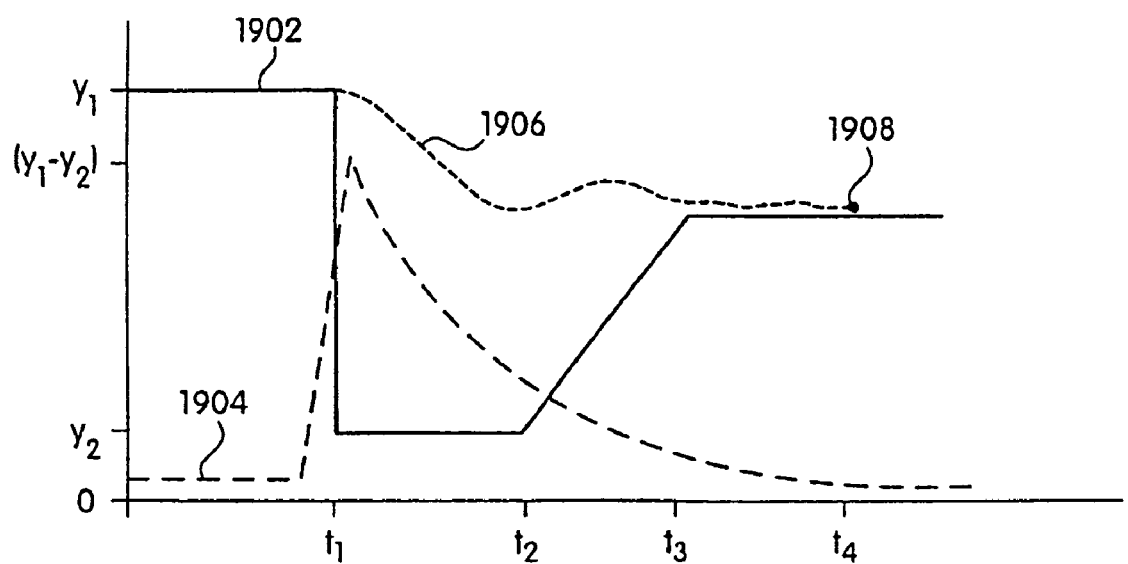
FIG. 19 illustrates, in graphical form, various signals which may exist in FIGS. 17A and 17B.

FIG. 19 shows various signals which may exist at various locations in FIGS. 17A and 17B. Signal 1902 represents a possible control signal produced by a control unit. At time $t_0$ the control signal is at a value $y_1$. At $t_1$, the control signal abruptly changes values from $y_1$ to $y_2$. This change may be caused by a mode transfer in the system. The signal 1904 represents the decaying offset value which may be added to the control signal 1902. At $t_0$ the offset value is substantially equal to 0. At time $t_1$ the value of the offset rises to a level equal to $y_1-y_2$. That is, of course, assuming that $y_1$ is equal to the value which was applied to the system at time $t_1$. The offset value decays over time to substantially 0 at a time $t_4$.

The signal 1906 represents the value of the smoothed control signal that is applied to the system (i.e., the smoothed control signal). The value of signal 1906 is equal to the value of signal 1902 plus the value of signal 1904. The signal 1906 decays in a manner similar to the signal 1904 until time $t_2$ when the control signal begins to rise. Due to the rise in the control signal 1902, the signal 1906 also may rise. At time $t_3$ when the control signal 1902 begins to flatten out, the smooth output signal 1906 again begins to follow the decaying offset signal 1904 until the time $t_4$ when the decaying offset signal 1904 has decayed substantially to 0. At time $t_4$ the control signal 1902 and the smoothed output signal 1906 are substantially the same as indicated by point 1908.

System Operation

FIGS. 20 and 21 show example control loops for controlling the position of the clusters and the wheels of a transport device. These example control loops may be used to stabilize the human transport device. As one will readily realize, the control loops may be integrated into a single control loop that produces both cluster and wheel control commands. In addition, various portions of these control loops may be omitted and other portions may be added depending on the functional capabilities of the transport device. Furthermore, one of ordinary skill that the various control blocks discussed in relation to FIGS. 20 and 21 may be implemented in either hardware, software, or a combination of both.

Referring now to FIG. 20, the wheels control loop 2000 includes a frame control sub-loop 2002, a wheel control sub-loop 2004, a yaw control sub-loop 2006, and a cluster velocity monitoring control sub-loop 2008. The control loop of FIG. 20 is given with reference to a single wheel. Specifically, the control loop may operate a right wheel of the transport device. In some embodiments a controller may exist for each wheel of the transport device. However, a single control loop could be used to control all of the wheels.

The frame control sub-loop 2002, based upon reference frame related values and actual frame related values generates signals that attempt to stabilize the frame by controlling the rotation of the wheels. For example, if the frame is pitching forward because the transport device has dropped off a curb, the frame control sub-loop 2002 may cause the wheels motors to drive the wheels forward at a higher velocity in order to keep the center of gravity over the footprint of the transport device.

The wheel control sub-loop 2004 may be used to attempt to match the performance of the transport to desired user inputs. That is, the wheel control sub-loop 2004 may cause the wheels to closely follow the user inputs. In addition, the position of the wheels may be important when in wheels balance mode and balance mode where the primary stabilization comes from the wheels. As such, the wheel control sub-loop may be disconnected from the user inputs 2010 when the system is in wheels balance mode.

The yaw control sub-loop 2006 may be implemented to ensure that the transport device may turn. Based on differential wheel motor velocities and user inputs, the yaw control sub-loop 2006 may produce a control signal that causes differing wheel control voltages to be applied to each of the wheel motors.

The cluster velocity monitoring control loop 2008 uses information about the kinematic state of the cluster to affect the operation of the wheels. If a wheel of the cluster starts to lift of the ground, $L_2(\cos \phi_c)$ (block 2078) times a low pass filtered cluster velocity (block 2080) is less than zero. In this example, the cluster velocity monitoring control sub-loop 2008 will create a signal that causes the wheels to accelerate to keep the center of gravity over the footprint. L2 is the distance from the wheel axis to the cluster pivot.

The wheels control loop 2000 may more receive user inputs 2010 from the user of the transport device. The user inputs may be received, for example from a joystick. The user inputs 2010 may include a commanded FORE/AFT velocity 2012 and a commanded YAW velocity 2014. Both the commanded FORE/AFT velocity 2012 and the commanded YAW velocity 2014 may be disconnected by switches 2016 and 2108, respectively, when the transport device is correcting the pitch of the device or is in the wheels balance sub-mode. The reason the switches 2016 and 2018 may be turned off during pitch correction and wheel balance mode is that in either case stabilizing the device becomes comes more important than responding to user input commands.

For example, the simplified model of the transport device in enhanced mode with one set of wheels off the ground (see e.g., FIG. 7A) gives a relation for pitch acceleration as a function of cluster and wheel torques $\tau_c$ and $\tau_w$, respectively, where:

$$J\theta_1'' = (1-(L_1 \sin \theta_1)/(L_2 \cos \phi_c))\tau_c - ((L_2 \cos(\theta_1-\phi_c)/(r_w \cos \phi_c) + (L_2 \sin \theta_1)/(L_1 \sin \phi_c))\tau_w$$

where $L_2$ is the distance from the wheel axis to the cluster pivot and $\tau_w$ is the radius of the wheels. The coefficient in front of the cluster torque $\tau_c$ gives a good indication of how well the cluster can affect the pitch. The further the transporter is pitched away from the balancing wheel The more affective the cluster will be at straightening the pitch. In contrast, if the center of gravity is close to being over the rear wheel, $L_1 \sin \theta_1 \approx L_2 \cos \phi_c$, and the cluster torque coefficient approaches zero. A criteria for entering the wheels balance controller is the magnitude of the cluster torque coefficient. When this coefficient is small, wheels PD and wheels POC will not be as effective as the wheels balance controller which uses the wheels as a primary means of affecting pitch. There is also the additional condition that the cluster angle must be high enough that there is a high probability that only one set of wheels is on the ground. Thus, the primary means for balancing the transport device are the wheels. Therefore, the control loop does not want to consider user input commands because, if it did, the transport device may not be as effective at stabilizing the transport device.

Returning again to FIG. 20, when not pitch correcting in wheels balance, the FORE/AFT velocity command 2016 is passed through a velocity slew limiter 2020 which may limit the amount of forward velocity. For instance, the velocity may be desired to be reduced when the platform is high.

The command FOR/AFT velocity 2012 may be summed, at summer 2022, with the commanded YAW velocity 2012 to determine a desired velocity for each wheel. This desired wheel velocity is utilized by the wheel control subsystem 2004 to determine the wheel velocity error, the wheel position error and a wheel velocity feed forward input. In order to determine the wheel velocity error, the output of summer 2022 is combined with the current wheel velocity at summer 2024. The wheel velocity error may be passed thru an error limit function 2026 which is then low-pass filtered by filter 2028. The output of the low-pass filtered wheel velocity error is then multiplied by a wheel velocity error gain constant 2030 to produce a portion of the wheels command.

In order to determine the wheel position error, the output of summer 2024 is integrated by integrator 2032 and passed through an error limiter 2034. The position error is multiplied gain 2036 to create a portion of the total wheel command.

The wheel velocity feed forward value may be determined by passing the desired velocity value (output of summer 2022) through low-pass filter 2038 and multiplying the wheel velocity feed forward gain value 2040. Feeding forward a wheel velocity enables the control system to, in essence, anticipate the motor voltage required for the commanded speed without having to deal with large steady state velocity or position error signals.

Each of the error signals created in the wheel control sub-control loop 2004 may be provided to the summer 2042 in order to be added to all of the other error determinations which will in turn be used to create the wheel voltage $V_w$.

The wheels control loop 200 may also include the frame pitch parameter related sub-control loop 2002 which produces a frame pitch error and a pitch rate error. The frame pitch error is created by comparing the current frame pitch with a desired frame pitch at summer 2046. The desired frame pitch may be estimated based upon the parameters of the transport device. In one embodiment, the desired frame pitch 2044 is the frame pitch which would place the center of gravity directly over the center point of the cluster. This desired frame pitch may be based upon location of the center of gravity as determined by the description below. The difference between the desired frame pitch and the current frame pitch may be filtered by low-pass filter 2048 and multiplied by the frame pitch gain 2050 to determine another portion of the wheel command.

The pitch rate error may be determined by comparing the current pitch rate with a desired pitch rate 2052 at summer 2054. In one embodiment, the pitch rate is equal to 0, thus indicating that the transport device is fully stabilized. The difference between the current frame pitch and the desired pitch rate is filtered by low-pass filter 2056 and multiplied by the pitch rate gain 2058 to produce another portion of the wheel command. Both the frame pitch and the pitch rate error are provided to the summer 2042.

The commanded YAW velocity 2018 may be provided to the YAW sub-control loop 2006 in order to control the yaw errors signals for the transport device. In the YAW velocity control sub-loop 2006, a YAW velocity error and a YAW position error may determined. The YAW velocity control signal is determined by passing the difference between the commanded YAW velocity 2018 and the current YAW velocity (as determined by summer 2060) thru a limiter 2062, and low-pass filter 2064, and multiplying the output of the low-pass filter 2064 by a YAW velocity gain 2066. Similarly, the difference between the commanded YAW velocity 2018 and the current YAW velocity may passed thru integrator 2068 and limited by limiter 2070. The limited signal may be the multiplied by a YAW position gain 2072 to produce the YAW position command. Both the YAW velocity command and the YAW position command are provided to the summer 2042.

The wheels controller 200 may also include a cluster velocity monitoring control sub-loop 2008 that may be turned off if $\phi_c$ times a low-pass filter cluster velocity (the product of blocks 2078 and 2080 as determined by block 2082) is less than zero by switch 2076.

All of the portions of the wheels command are summed together at block 2042 to create a wheel control voltage $V_w$. As discussed above, this voltage may be smoothed by a smoother 2086 to create a smooth voltage control signal $V_{ws}$. The decaying filter offset 2088 is passed thru low-pass filter 2090 and added to $V_w$ in the smoother 2086 to produce $V_{ws}$ as described above. $V_{ws}$ is passed to the plant 2092. The plant may include both the wheels motors and the cluster motors and may output the current frame pitch the current pitch rate, the right wheel velocity, the left wheel velocity, the cluster position, and the cluster velocity, among other things.

FIG. 21 is an example of a cluster control loop 2100. Similar to the wheel control loop, the cluster control loop 2100 may include a frame related sub-control loop 2102 which produces a frame pitch error and a pitch rate error. This frame related sub-control loop 2102 may be the same control loop as described above or it may be a separate control loop maintained in the cluster control loop 2100.

In addition, the cluster control loop may include a maximum cluster position sub-loop. This sub-loop receives a value of $\phi_{c,stop\ angle}$ which is the maximum cluster angle allowable in enhanced mode. If the cluster is at an angle greater than $\phi_{c,stop\ angle}$ then the cluster position controller is disconnected by switch 2106. If the switch 2106 is open the current cluster position is subtracted from $\phi_{c,stop\ angle}$ at summer 2108. The output of summer 2108 (cluster position error) may then be multiplied by cluster position gain 2110 to determine a portion of the cluster position command.

The cluster control loop 2100 may also include a cluster velocity sub-control loop 2112 which produces a cluster velocity error. In the cluster velocity sub-control loop 2112, the current cluster velocity may be subtracted from the desired cluster velocity 2114 by summer 2116. The desired cluster velocity, in one embodiment, may be set to zero. The output of summer 2116 may be passed thru a low-pass filter 2118 and multiplied by a cluster velocity gain 2120 and provided to the summer 2122. The output of the summer 2112 may then be smoothed, as described above, by a smoother 2122, to create a signal provided to the plant $V_{cs}$.

Usage Examples of Enhanced Mode

In one embodiment, enhanced mode may be designed to be used on irregular terrain. In this embodiment, the transport device may use four ground contacting wheels, all of which may be motorized, to increase traction in the FORE/AFT plane. Examples of how a transport device operating in an example enhanced will follow.

Traversing Surfaces

Because both the clusters and the wheels may be used to stabilize the transport device in enhanced mode, enhanced mode may work well over rough and irregular surfaces. In one embodiment, all four wheels may be driven may separate motors and, in such an embodiment, the transport device may be also be able to deal with slippery surfaces. For instance, if the wheel velocity of one of the wheels increases greatly, the control unit may reduce the amount of power provided to that wheel until the velocity of the wheel becomes similar to the velocity of other wheels.

Obstacles

In some embodiments, enhanced mode may allow the transport device to traverse obstacles, such as a curb or a rock. For example, when traversing a curb, the user may direct the transport device (through a user input) to contact the curb. The user continues to direct the transport device forward even as the wheel is contacting the curb which in turn causes the wheel position error term (see FIG. 20) to increase. As the error term increases, the torque applied to the wheels may cause the front wheels to drive up and onto the curb. As the front wheels rise up the curb, the cluster is rotated in order to keep the frame pitch near zero. Depending upon how fast the above operation is conducted, the control unit may switch between wheel PD mode and wheels POC mode (depending upon the rate the cluster is rotated). To get the rear wheels on the curb, the user continues to drive forward and the cluster is rotated in the opposite direction.

In one embodiment, climbing a six inch (for example) curb may cause the transport device to switch to wheels balance mode as the cluster is rotated. As the transfer occurs, the wheels may be driven back away from the curb in order to stabilize the transport device. This may he an effective way of alerting the user that the curb being traversed may be too large and should be avoided.

To go down a curb, the user simply drives the transport device off the curb. If done slowly, the transport device may remain in wheels PD mode. If the user drives off the curb at a higher velocity the cluster rotation may be great enough to cause the transport device to transfer to wheels POC mode, at least until all four wheels are on the ground again. A fast drop off the curb may create a cluster rotation that is great enough to cause the transport device to enter wheels balance mode. The transport device then takes over control of itself (i.e., disregards user input commands) in order to drive the wheels forward enough such that the center of gravity is over the footprint of the device.

Center of Gravity Estimation

From time to time in the foregoing description, reference has been made to the location of the center of gravity. In some embodiments, the transport device may be an estimate of the location of the center of gravity directly. In other embodiments, the transport device may use desired component orientations that may be based upon an estimate of the location of the center of gravity. For instance, in FIG. 20, the desired pitch (e.g., block 2044) that was compared to the current frame pitch (at block 2046) is a frame pitch that may be based upon an estimate of the location of the center of gravity. That is, the desired pitch may be a frame pitch that is known to place the center of gravity over the footprint of the transport device when certain components of the transport device are in a certain orientation.

The following description will detail how a center of gravity for a device may be estimated in order to determine desired orientations of components of a device. Although the center of gravity may be referred to in the context of a human transport device, it will be readily apparent that the teachings herein related to the estimation of a location the center of gravity is not limited to estimating the center of gravity for a transport device. As such, the following description will, in addition to referring to human transport devices, refer to any device where estimations of the center of gravity may be needed. Such devices will be referred to as systems in the forthcoming description.

Figure 22A:
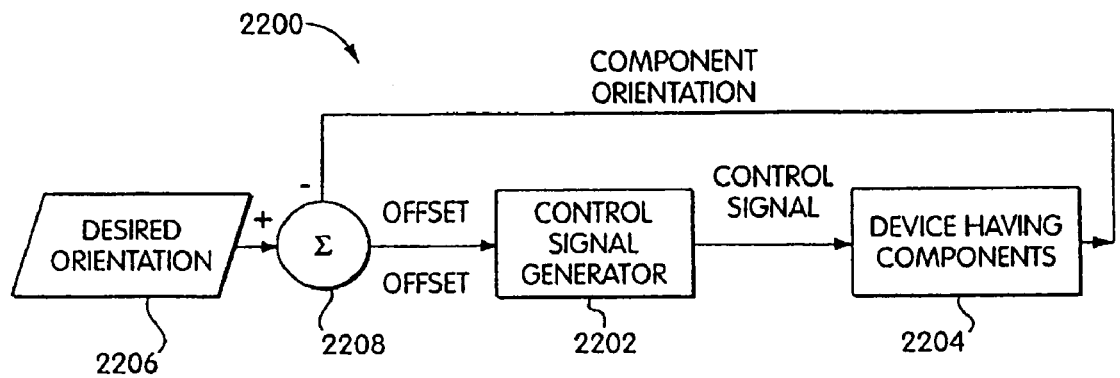
FIG. 22A illustrates an example of a control loop in which a center of gravity estimate may be used.

FIG. 22A shows an example of a control loop in which a center of gravity estimate may be used. The control loop 2200 includes a control signal generator 2202 and a device 2204 having several components. The control signal generator 2202 generates a control signal which may cause actuators (not shown) contained in the device 2204 to vary the orientation of various components of the device 2204. The control signal generator 2202 may be included in one of the components of the device 2204. However, the control signal generator 2202 is shown as a separate block for ease of explanation and to clearly demonstrate that the control signal generator 2202 provides a control signal to at least one actuator of the device 2204 in order to alter the orientation of one of the components. The control signal generator 2202 may be similar to the control unit (electronics box) of a transport device described above.

An input to the control signal generator 2202 is a difference (or offset) between a current orientation of one of the components and a desired orientation 2206. The offset is the output of the summer 2208 which may subtract the current orientation from the desired orientation 2206 in order to create the offset value. The control signal generator 2202 receives the offset value and based on the value of the offset, creates a control signal which causes the device to alter the orientation of a component to reduce the offset.

Figure 22B:
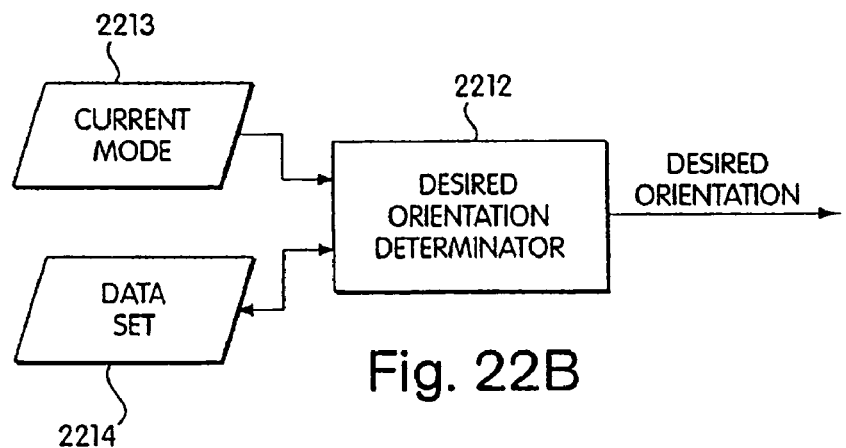
FIG. 22B illustrates a block diagram of a system which may create a desired orientation based upon an estimate of the location of the center of gravity.

FIG. 22B is a block diagram of a system which may create a value which represents a desired orientation of a component of a system. The desired orientation determinator 2212 receives several inputs and creates a desired orientation of a component as an output. The desired orientation may vary depending upon the mode of operation (datablock 2213) of the system being controlled. In one embodiment the desired orientation may be equal to an orientation of a component that is known (or calculated) to place the system in a balanced state. This information may be contained in the data set 2214. The dataset may loosely be referred to as an estimate of the location of the center of gravity. That is, when certain components of the device are in certain orientations, it may be assumed that the center of gravity of the device is at a specific location. This is tantamount to an estimate of the position of the center of gravity. How this dataset 2214 maybe created is discussed below.

The desired position determinator 2212 also receives the current mode 2213 of the system. In some systems, there may be different modes of operation which may use the estimate of the center of gravity in different manners. For instance, the device could be a human transporter that may self-stabilize in order to keep a user from falling off the transport device. In such systems, an estimate of the location of the center of gravity may be used in controlling the transport device such that the transport device is balanced. With reference again to FIG. 20, the estimate of the center of gravity may be used to determine the desired frame pitch of block 2046. How this estimate is determined and used is discussed below.

Figure 23:
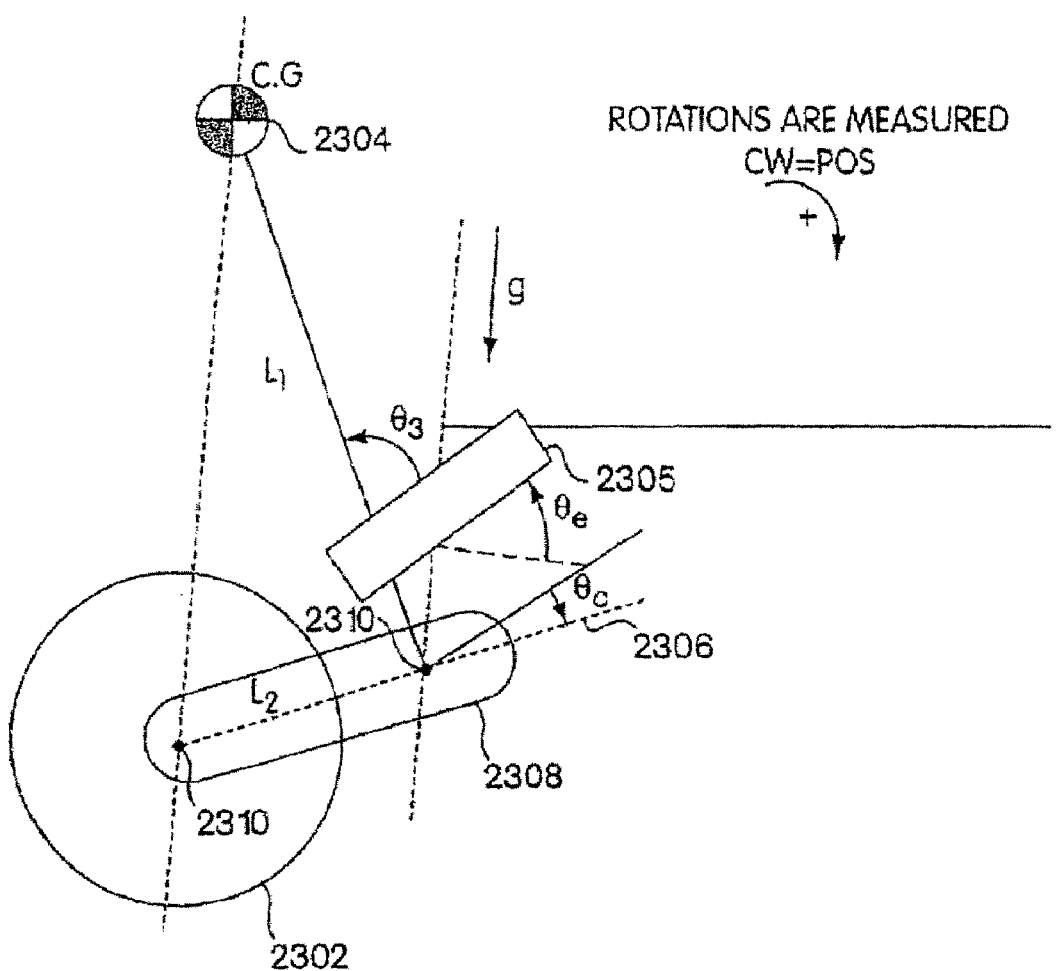
FIG. 23 illustrates an example of a free body diagram of a transport device.

FIG. 23 is an example of a transport device having the center of gravity 2304 displaced over a rear wheel 2302. The location of the center of gravity 2304 may be an estimated quantity that represents the location of the center of gravity for an entire system which includes the transport device, a user, and any other payload that may be carried by the user or placed on the transport device. The center of gravity 2304 may be located by the coordinate $\theta_3$ relative to the electronics box 2305 as well as the length L1 relative to the cluster axis 2306. In some embodiments, the angle $\theta_3$ may be the only variable that is used. In other embodiments, both $\theta_3$ and $L_1$ may be used to estimate the location of the center of gravity.

As discussed above, the electronics box 2305 (control unit) may include various sensors, such as pitch sensors, that may measure the orientation of the cluster 2308 and electronics box 2305. In addition, the orientation of the cluster 2308 may be determined by integrating an output of a cluster velocity sensor located on the cluster or in the electronics box 2305 or reported by the cluster motor.

The transport device may include a ground contacting member 2302 (in this embodiment, a wheel) that has a center point 2310. When the center of gravity 2304 is located above the center point 2310 (or any other point on the ground contacting member that provides for stability) the transport device is balanced.

In FIG. 23, angles are measured such that an arrow representing the angle which points in the clockwise direction may be given a positive value. For instance, the cluster position relative to the electronics box $\theta_c$ may be assigned a positive value.

The angle $\theta_3$ is the angle between $L_1$ and the electronics box 2305. The electronics box 2305 may contain tilt sensors that determine the orientation of various components of the transport device. These tilt sensors may measure the electronics box angle relative to the horizontal, $\theta_c$, directly. A controller (not shown) may monitor the angle of the cluster with respect to electronics box 2305. The distance $L_2$ is the distance from the center of cluster 2308 to the center point 2310 of the wheel 2302 in contact with the ground. $L_2$ is a known parameter which depends upon the specific transport device being used. In one embodiment, $L_2$ does not change during the operation of the vehicle, however, $L_2$ may vary depending upon which type of cluster the transport device employs.

When the center of gravity 2304 is over the ground contacting wheels center point 2310, one way to model the transport device is:

$$L_2 \cos(\theta_c+\theta_c+\pi)=L_1 \cos(\theta_3+\theta_c)$$

Upon expanding and regrouping terms the above equation becomes:

$$\cos\theta_c(L_2 \cos\theta_c+L_1 \cos\theta_3)=\sin\theta_c(L_2 \sin\theta_c+L_1 \sin\theta_3)$$

This equation could be solved to determine a desired orientation ($\theta_c$) of the electronics box 2305, for instance. Because $L_1$ and $\theta_3$ may be nonlinear trigonometric functions and the processing capability of a microprocessor located within the electronics box 2305 may be limited, it may be more efficient to avoid computing $\theta_c$ directly using trigonometric functions. In such a case, a lookup table and curve fitting scheme may be employed to generate the correct value for $\theta_c$. In order to do a curve fit based on the expanded and regrouped equation, the expanded equation may be simplified to $$L_2 \cos(\theta_c+\theta_c)=-K_1(h)\cos\theta_c+K_2(h)\sin\theta_c$$

and upon regrouping terms, $$\theta_c=a\tan((L_2 \cos\theta_c+K_1(h))/(L_2 \sin\theta_c+K_2(h)))$$

where $$K_1(h)=L_1(h)\cos\theta_3(h) \text{ and}$$

$$K_2(h)=L_1(h)\sin\theta_3(h)$$

and h=the platform height. This equation may be solved for $K_1(h)$ and $K_2(h)$ if two values of $\theta_c$ are known. After the values of $K_1(h)$ and $K_2(h)$ are known, simple trigonometric computations may be used to determine values of both $L_1$ and $\theta_3$. As discussed above, given $L_1$ and $\theta_3$, the location of the center of gravity is known (of course, the location is relative to a reference location which, in the case of a transport device may be a center point of the cluster. The curves discussed below provide for an efficient manner of determining two values of $\theta_c$ to be used in order to determine $K_1(h)$ and $K_2(h)$ and therefore, $L_1$ and $\theta_3$.

Alternatively, one can derive the electronics box angle as a function of the cluster angle with respect to gravity, $\phi_c$ which yield the equation:

$$\theta_c=\theta_3(h)+\pi/2-\sin^{-1}((L_2 \sin(\phi_c)/(L_1(h)))$$

Again, two values of $\theta_c$ may be required to solve for $L_1$ and $\theta_3$ if the transport is modeled based upon $\phi_c$ by the above equation.

Depending upon which mode of operation the transport device is operating, either electronics box angle or the cluster angle may be used in order to estimate the center of gravity. For instance, when operating in stair mode, it may be preferable to use the estimation of the desired electronics box angle based upon $\phi_c$.

Figure 24:
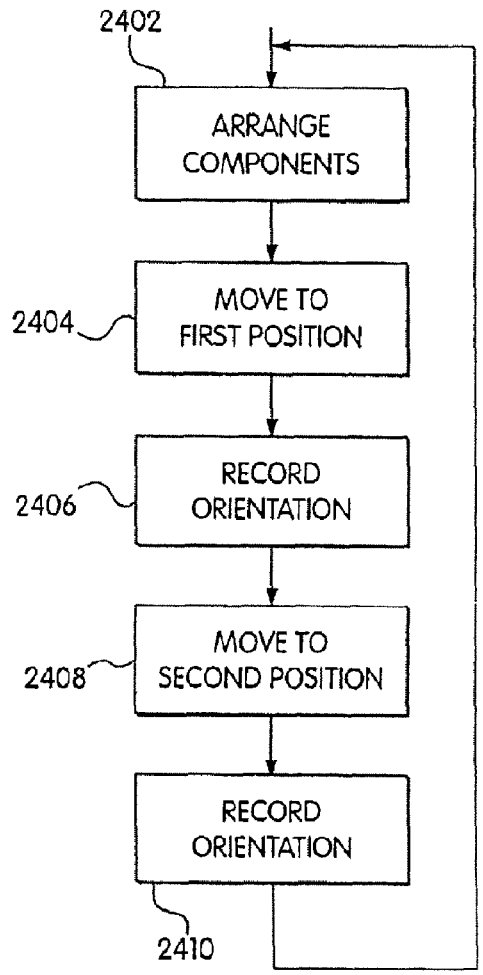
FIG. 24 illustrates an example of a method of creating a data set for estimating a location of the center of gravity of a device.

FIG. 24 is a flow chart of an embodiment by which a reference data set that may be used to estimate a position of the center of gravity may be created. FIG. 24 will be described in relation to FIGS. 25A-25C. The reason for creating such a reference data set may be at least two fold. First, a the data set allows the to be customized to a particular user. Second, the data set allows for efficient calculation of desired orientations of components of the transport device as described below.

Figure 25A:
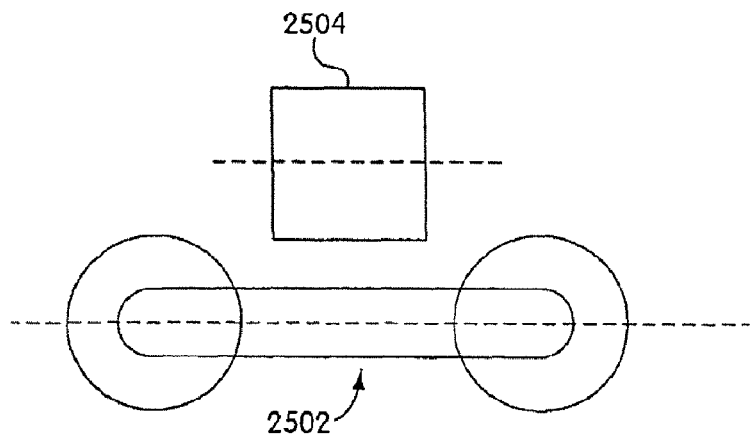
FIGS. 25A-25C graphically illustrate portions of the method of FIG. 24.

The method may begin at step 2402 where components of the device (e.g., a transport device) are arranged in a specific arrangement and the orientations of various components recorded. For instance, the cluster of a transport device may be placed at a first orientation and this value recorded. FIG. 25A shows a possible first orientation of the cluster 2502 which, in this example, may be represented as $\theta_c=0$ because the electronics box 2504 and the cluster are parallel to each other. In addition, the seat height may be recorded as an initial parameter. In one embodiment, the height of the platform may be as small as possible.

At step 2404, the transport device is then moved to a first position. The first position may be a position that places the center of gravity over one of the wheels of the cluster. At this point, the center of gravity is not known or estimated, however, it will be apparent that the center of gravity is over an axis of the wheels because the transporter will balance with little or no stabilization required by a person that is moving the transporter.

After the transporter has been placed in the first position at step 2404, the orientation at least one of the components may then be recorded at step 2406. The components whose orientation may be recorded may include, but is not limited to, the orientation of the electronics box ($\theta_3$), the cluster position with respect to gravity ($\phi_c$) and the seat height. Various orientation values may be recorded by either physically measuring the angles or, alternatively, by accessing the sensors of the electronics box. The sensors may be accessed by sampling data from the microprocessor or by reading the output of the sensors directly.

Figure 25B:
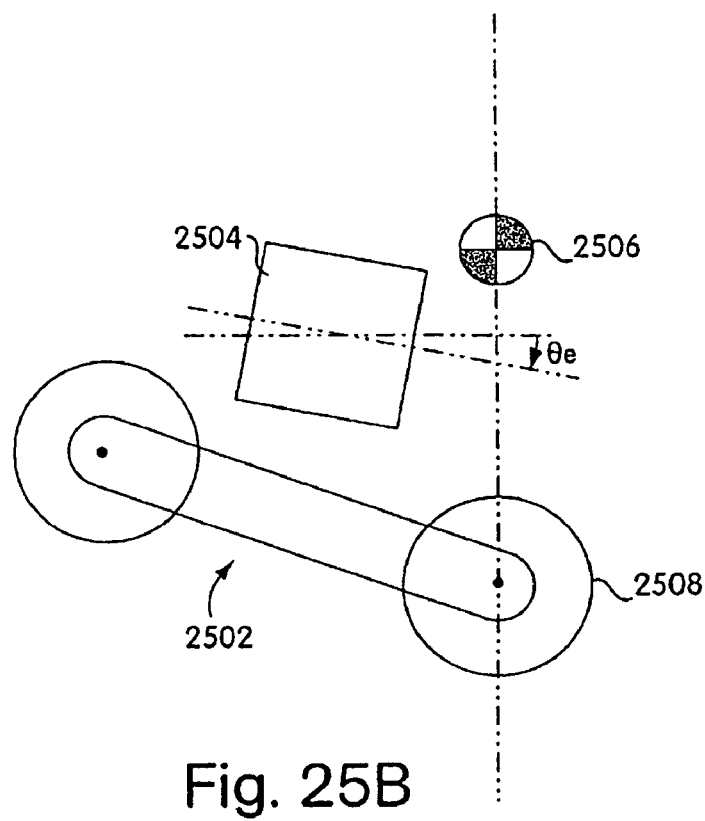
Figure 25C:
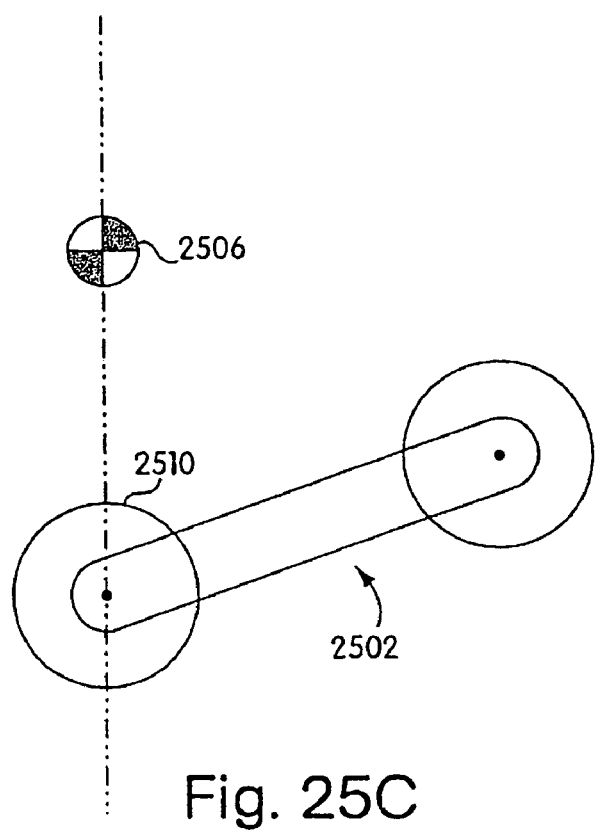

FIG. 25B shows a transport device in a first position. In this example, the center of gravity 2506 is located over the front wheel 2508 of a transport device. The angle of the electronics box $\theta_c$ is a positive value that may be recorded.

At step 2408, the transport device is placed in a second position. Similar to the first position, the second position may be a position that places the center of gravity 2506 over the rear wheel 2510 of a transport device such that the transport device is balanced (see FIG. 25C). At step 2410, the orientation of components of the device in the second position are then recorded.

The process described above may be repeated with, for example the initial cluster position placed at a different orientation and repeating all of the steps 2402-2410 described above. In addition, each time the process is conducted, the height of the platform may also be adjusted.

Figure 26:
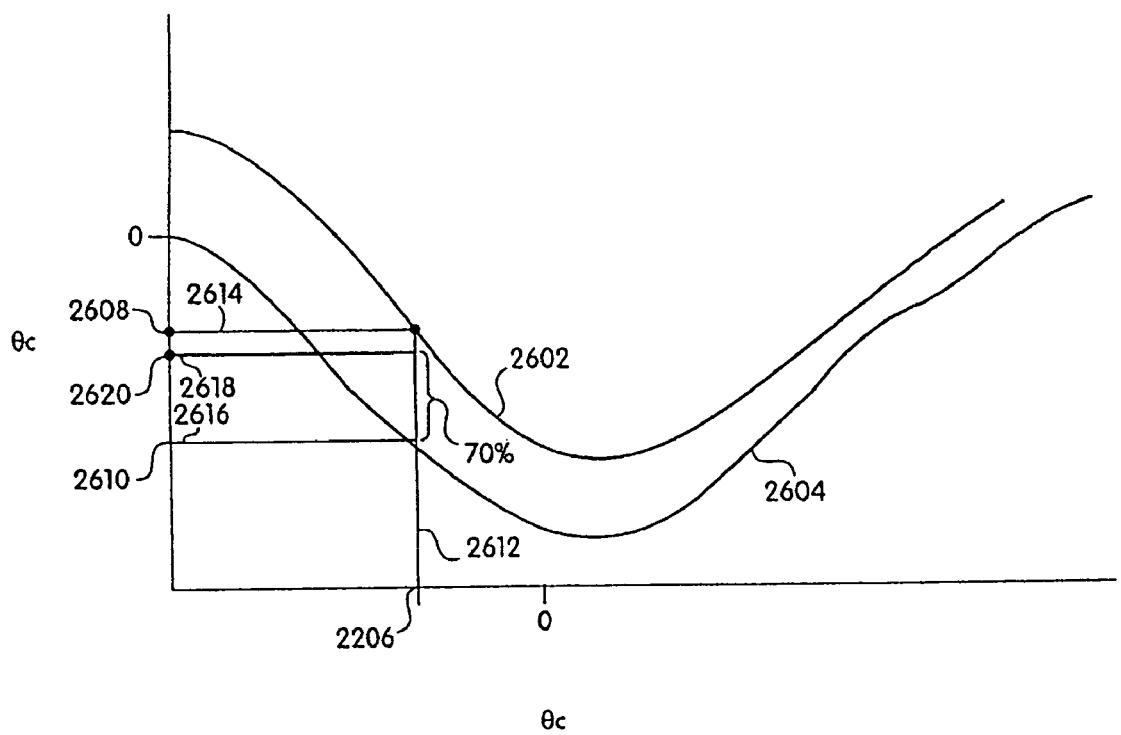
FIG. 26 illustrates a graphical representation of a data set that may be used to estimate the location of the center of gravity of a transport device.

FIG. 26 is a graphical representation of the results of performing several iterations of the process outlined above. The horizontal axis represents the relative cluster orientation ($\theta_c$) in radians and the vertical axis represents a corresponding electronics box orientation ($\theta_c$) in radians which place the center of gravity over the footprint of the device (i.e., between the two wheels). Of course a similar graphical representation could be created that relates $\theta_c$ to $\phi_c$. The first trace 2602 represents the results of the process with the platform height at a minimum height and the second trace 2604 represent the results of the process with the platform at a maximal height. As discussed above, the these traces follow the above equations relatively closely. As such, by implementing these traces as a look-up table, based upon the cluster orientation, two values for $\theta_c$ may be readily determined. As discussed above, these two values of $\theta_c$ allow for $L_1$ and $\theta_3$ be quickly calculated. Further, because curves have been generated for both the maximal and minimal platform heights, any desired electronics box orientation may be determined for any seat height at any cluster position. It has been found that $L_1$ and $\theta_3$ may be linearly estimated between these two values.

Referring again to FIG. 26, if the current cluster position is 2606, the two recorded electronics box locations will be 2608 and 2610. This is shown graphically by lines 2612 (current cluster position) and 2614 and 2616 (the possible electronics box orientations) These two values of $\theta_c$ may be used to linearly interpolate for $L_1$ and $\theta_3$.

The values of $L_1$ and $\theta_3$ may be used in various manners depending, for example, upon the mode the system is operating in. For example, if the system is a transport device, the system may include a balance mode, a stair mode, and an enhanced mode, as discussed above. The desired orientation of the electronics box in enhanced mode may be referred to as thetaref_fourwheels. Thetaref_fourwheels, may be solved for based only upon the value of $\theta_3$. Referring to FIG. 23, an equation that would put the center of gravity over center point 2310 of the cluster 2308 is $$\theta_c = 90° + \theta_3$$

Thus, the desired electronics box angle is easily calculated by, determining $\theta_3$ only. This desired orientation may, in some embodiments, be used as the desired pitch value of block 2044 (FIG. 20).

When in balance mode the estimate of the location of center of gravity based upon $L_1$ and $\theta_3$ may be used to determine a electronics box orientation (theta_balance) that places the center of gravity of an axle over the ground contacting wheel. An electronics box orientation may be determined by solving the equation $$\theta_c = \mathrm{atan}((L_2 \cos \theta_c + K_1(h))/(L_2 \sin \theta_c + K_2(h)))$$

given $\theta_3$ and $L_1$.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method for transitioning between modes in a multi operating mode vehicle characterized by a control signal, the control signal governing a parameter of the multi operating mode vehicle, the method comprising:
   a. determining an offset value equal to a difference between a value of the control signal prior to a mode change and a value of the control signal after a mode change;
   b. applying a control signal to the multi operating mode vehicle equal to the value of the control signal prior to a mode change plus the offset value subject to a time decay;
   c. determining whether a mode exit value has been traversed; and
   d. terminating application of the offset value upon traversal of the mode exit value.

2. A method for transitioning between modes in a multi operating mode vehicle characterized by a control signal, the control signal governing a parameter of the vehicle, the method comprising:
   a. determining an offset value equal to a difference between a value of the control signal prior to a mode change and a value of the control signal after a mode change;
   b. determining a value for the control signal that is equal to the value of the control signal prior to a mode change plus the offset value subject to a time decay to create a smoothed control signal; and
   c. applying the smoothed control signal to the vehicle.

* * * * *